US012032094B2

(12) United States Patent
Lu et al.

(10) Patent No.: US 12,032,094 B2
(45) Date of Patent: Jul. 9, 2024

(54) CHIP-SCALE SILICON-BASED HYBRID-INTEGRATED LiDAR SYSTEM

(71) Applicant: Shanghai Jiao Tong University, Shanghai (CN)

(72) Inventors: Liangjun Lu, Shanghai (CN); Weihan Xu, Shanghai (CN); Linjie Zhou, Shanghai (CN); Jiao Liu, Shanghai (CN); Jianping Chen, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 824 days.

(21) Appl. No.: 17/170,715

(22) Filed: Feb. 8, 2021

(65) Prior Publication Data

US 2021/0181310 A1    Jun. 17, 2021

Related U.S. Application Data

(63) Continuation of application No. PCT/CN2019/084038, filed on Apr. 24, 2019.

(30) Foreign Application Priority Data

Mar. 13, 2019  (CN) .......................... 201910187328.1

(51) Int. Cl.
*G01S 7/48*    (2006.01)
*G01S 7/481*   (2006.01)
(Continued)

(52) U.S. Cl.
CPC .......... *G01S 7/4813* (2013.01); *G01S 7/4818* (2013.01); *G01S 17/42* (2013.01); *G01S 17/88* (2013.01)

(58) Field of Classification Search
None
See application file for complete search history.

(56) References Cited

U.S. PATENT DOCUMENTS

| 2008/0157090 | A1  | 7/2008  | Thomson et al. |
| 2015/0346340 | A1* | 12/2015 | Yaacobi ................. G01S 7/499 356/5.11 |
| 2018/0188452 | A1  | 7/2018  | Sun et al. |

FOREIGN PATENT DOCUMENTS

| CN | 104133336 A | 11/2014 |
| CN | 106410607 A | 2/2017 |

(Continued)

OTHER PUBLICATIONS

Karel Van Acoleyen et al., "Off-chip beam steering with a one-dimensional optical phased array on silicon-on-insulator," Optics Letters, vol. 34, No. 9, pp. 1477-1479 (May 1, 2009).

(Continued)

*Primary Examiner* — Hovhannes Baghdasaryan
(74) *Attorney, Agent, or Firm* — Mei & Mark LLP; Manni Li

(57) ABSTRACT

A chip-scale silicon-based hybrid-integrated LiDAR system, wherein a transmitting end thereof sequentially comprises a narrow-linewidth tunable laser source, a silicon-nitride-based beam splitter, a silicon-based phase shifter array and a silicon-nitride-based unidirectional transmitting antenna array w.r.t the optical path. Based on the principle of reciprocity of light propagation, the receiving end thereof sequentially comprises a silicon nitride unidirectional receiving antenna array, a silicon nitride beam splitter and a silicon-based coherent receiving module. It also comprises a backup system and an electric controller as the driver of the phase shifters and the processing module. Modules on the (Continued)

silicon platform and the silicon nitride platform are monolithic integrated in a multilayer sandwiched fashion by means of a tapered silicon/silicon nitride evanescent interlayer coupler; and a gain chip in the tunable laser module and a silicon nitride waveguide are hybrid-integrated by horizontal coupling.

16 Claims, 14 Drawing Sheets

(51) Int. Cl.
  G01S 17/42 (2006.01)
  G01S 17/88 (2006.01)

(56) References Cited

FOREIGN PATENT DOCUMENTS

| | | |
|---|---|---|
| CN | 106773028 A | 5/2017 |
| CN | 106908776 A | 6/2017 |
| CN | 108231803 A | 6/2018 |
| CN | 108513619 A | 9/2018 |
| CN | 108646430 A | 10/2018 |
| CN | 108761439 A | 11/2018 |
| CN | 108761955 A | 11/2018 |
| CN | 108896977 A | 11/2018 |
| CN | 108957900 A | 12/2018 |

OTHER PUBLICATIONS

Jie Sun et al., "Large-scale nanophotonic phased array," Nature, vol. 493, pp. 195-199 (Jan. 10, 2013).

J. C. Hulme et al., "Fully integrated hybrid silicon two dimensional beam scanner," Optics Express, vol. 23, No. 5, pp. 5861-5874 (2015).

David N. Hutchinson et al., "High-resolution aliasing-free optical beam steering," Optica, vol. 3, No. 8, pp. 887-890 (Aug. 2016).

Christopher V. Poulton et al., "Large-scale silicon nitride nanophotonic phased arrays at infrared and visible wavelengths," Optics Letters, vol. 42, No. 1, pp. 21-24 (Jan. 1, 2017).

Christopher V. Poulton et al., "Coherent solid-state LIDAR with silicon photonic optical phased arrays," Optics Letters, vol. 42, No. 20, pp. 4091-4094 (Oct. 15, 2017).

Yu Zhang et al., "Sub-wavelength-pitch Silicon-Photonic Optical Phased Array for Large Field-of-Regard Coherent Optical Beam Steering," European Conference on Optical Communication (ECOC), DOI: 10.1109/ECOC.2018.8535530.

Moshe Zadka et al., "On-chip platform for a phased array with minimal beam divergence and wide field-of-view," Optics Express, vol. 26, No. 3, pp. 2528-2534 (Feb. 5, 2018).

Zhuang, Dongwei et al., "Omnidirectional beam steering using aperiodic optical phased array with high error margin," Optics Express, vol. 26, No. 15, pp. 19154-19170 (Jul. 23, 2018).

Tin Komljenovic et al., "On-chip calibration and control of optical phased arrays," Optics Express, vol. 26, No. 3, pp. 3199-3210 (Feb. 5, 2018).

\* cited by examiner

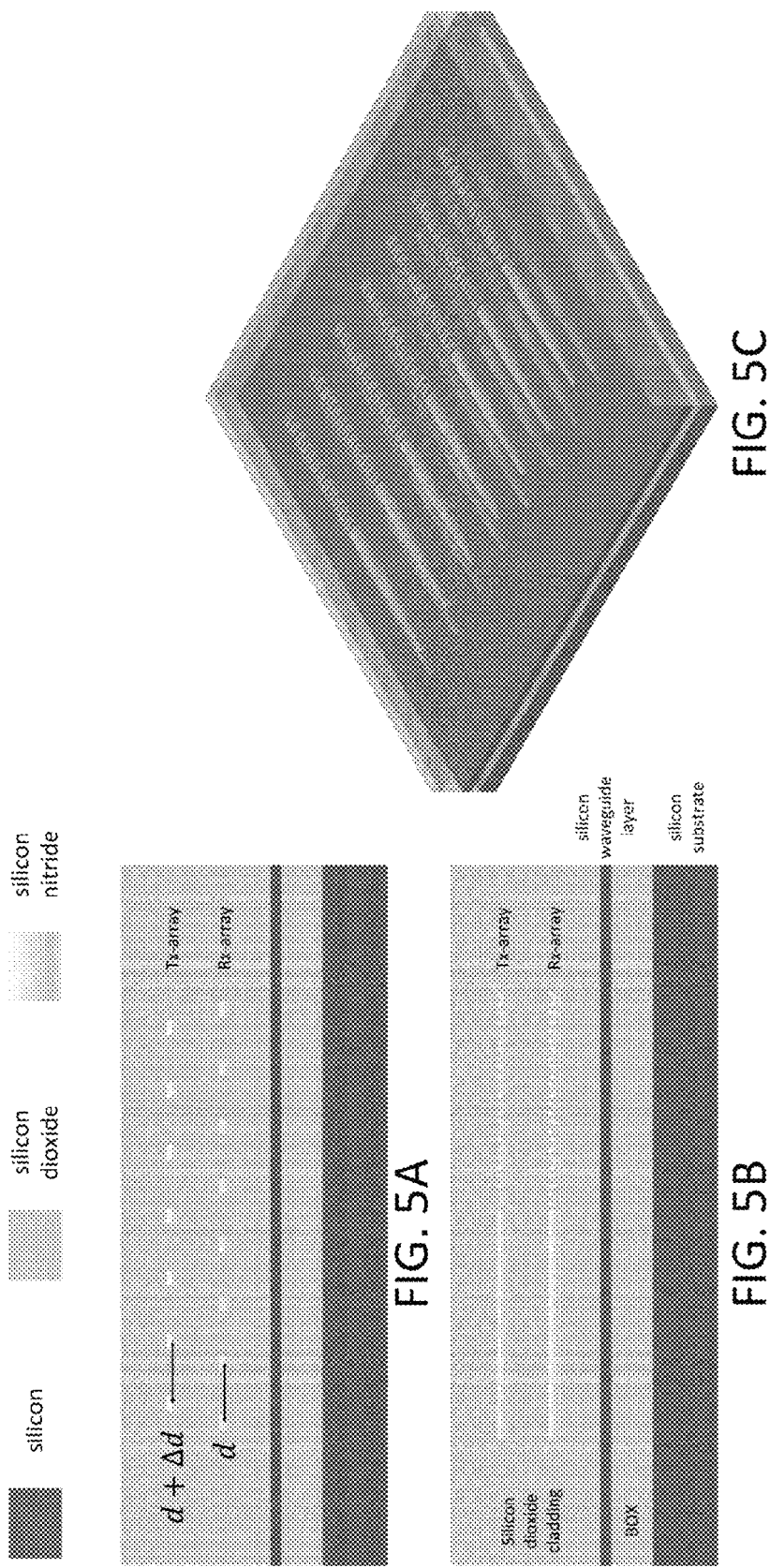

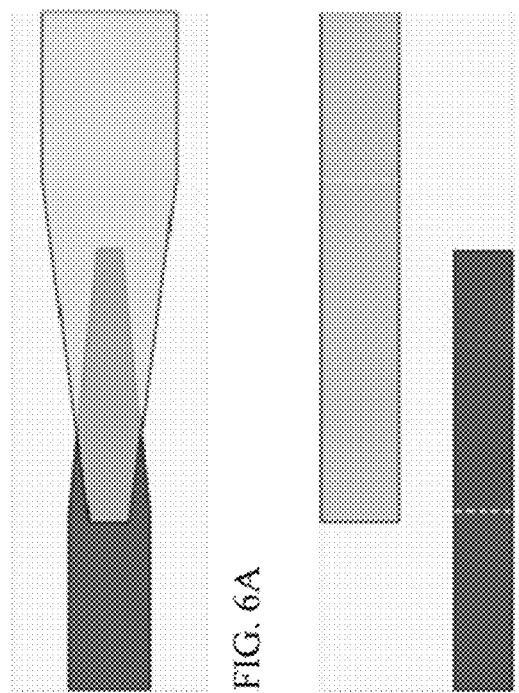
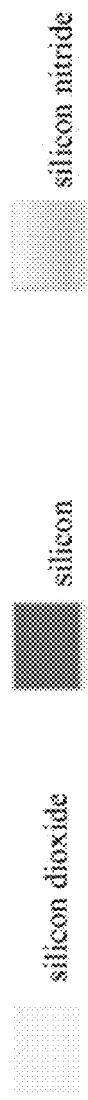
FIG. 6A  FIG. 6B  FIG. 6C

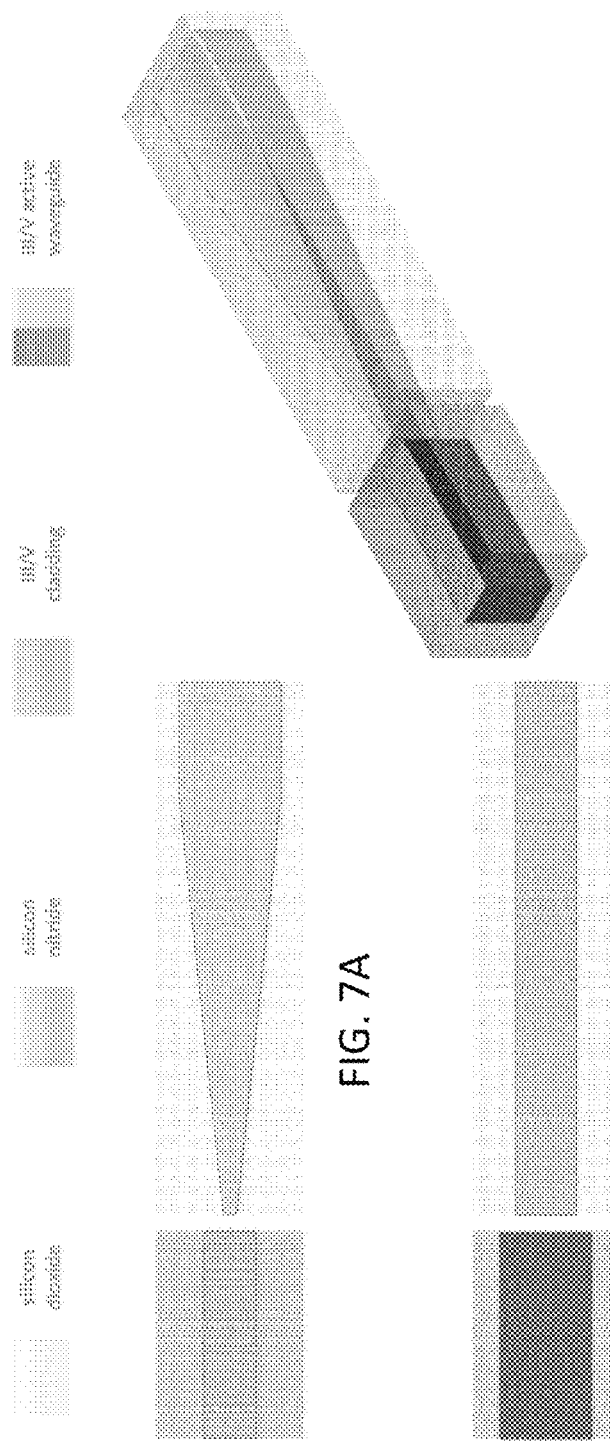

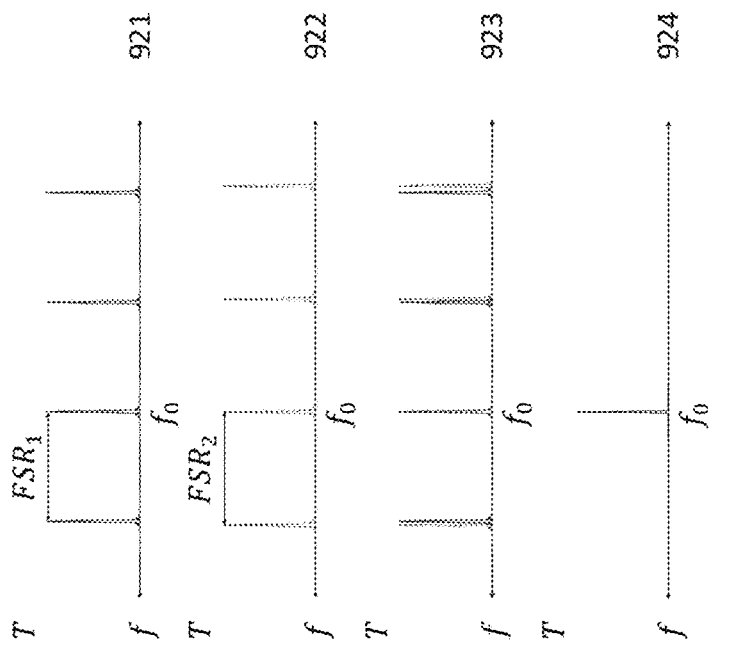
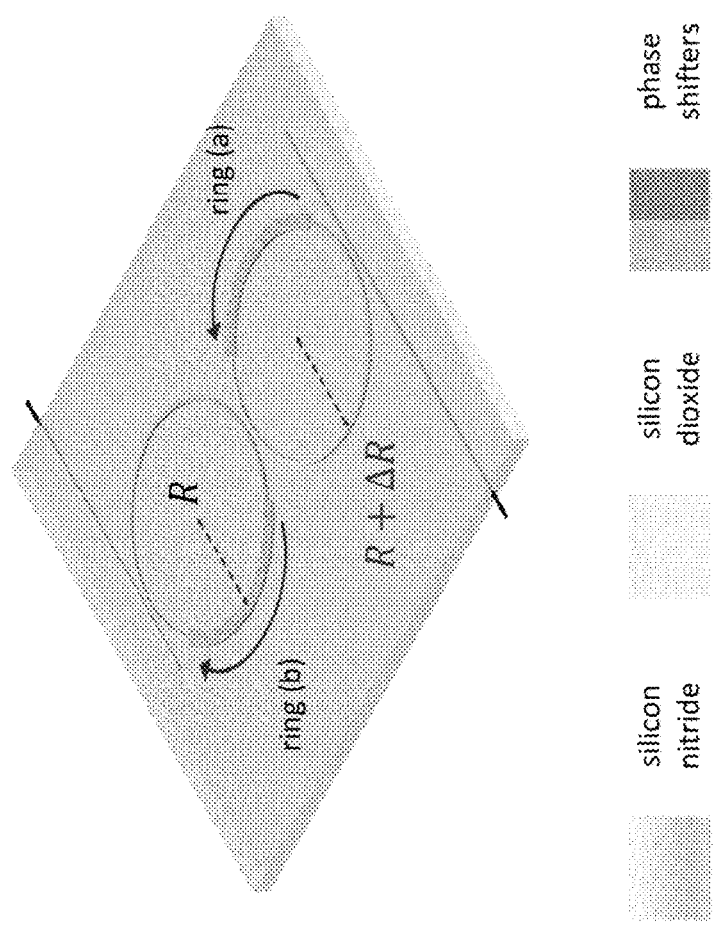
FIG. 9A
FIG. 9B

CHIP-SCALE SILICON-BASED HYBRID-INTEGRATED LiDAR SYSTEM

CROSS-REFERENCE TO RELATED APPLICATIONS

The subject application is a continuation of PCT/CN2019/084038 filed on Apr. 24, 2019, which claims priority on Chinese Application No. CN201910187328.1 filed on Mar. 13, 2019 in China. The contents and subject matter of the PCT international application and Chinese priority application are incorporated herein by reference.

TECHNICAL FIELD

The present invention belongs to field of light detection and ranging (LiDAR), and particularly, a chip-scale silicon-based hybrid-integrated LiDAR system.

BACKGROUND ART

LiDAR (Light Detection and Ranging) is a remote sensing technology that samples the environment at high refresh rate with laser to obtain three-dimensional depth information. Similar to their radio-domain counterpart, LiDARs rely on the principle of transmitting and receiving electromagnetic waves reflected by a target. However, the operating wavelength of the LiDAR is much smaller than that of the RADAR, which inherently provides higher ranging and imaging resolution, greater instantaneous bandwidth, and greater integration potential. At the same time, with the rapid development of military and civil space telemetry and unmanned vehicles, the demand for high-speed acquisition of detailed sensing data from the environment is increasing, which promotes the rapid growth of the LiDAR market. Currently, the LiDAR solution based on mechanical rotation systems has matured, and active industry competition has been carried out towards miniaturization in order to achieve both light weight and low cost and subsequently higher market share. Nevertheless, since the mechanical system has moving parts, it is difficult for the mechanical solutions to simultaneously realize high-speed and large-angle light beam rotation in consideration of mechanical wear, structural reliability, accuracy of motion control, and influence of inertia in an acceleration environment. The sampling speed of the LiDAR in free space is therefore limited. In other words, key technical advantages provided by optics are limited by the bottleneck of the mechanical system, and eventually the application of the technology is limited due to a flawed trade-off between device complexity and real-time performance.

In addition to the traditional mechanical solutions, some semi-solid state micro-electro-mechanical systems (MEMS) solutions based on servo motors and micro-mirror arrays, as well as hybrid solid-state solutions between mechanical solutions and MEMS systems, have also been investigated preliminarily in the industry. However, due to the fact that semi-solid state systems still contain moving parts, the advantages of the solution in terms of imaging speed increase are not significant. Meanwhile, with the development of liquid crystal on silicon (LCoS), all-solid-state liquid crystal phased array solutions have also been developed. Nevertheless, due to the limitation of cell size and power threshold of liquid crystal phased array as well as the lack of competitiveness of cost and control complexity of liquid crystal on silicon technology, liquid crystal phased array solutions have become less attractive after some intensive exploration in the academic field.

Even though the liquid crystal phased array itself gradually fades into twilight, it has become evident that the LiDAR solutions based on the phased array principle can get rid of the constraint of moving parts and potentially achieve three orders of magnitude or more scanning speed improvement. Overall, the phased array consists of coherent wave sources with stable phase relation. The radiation fields of the wave sources form interference patterns in the free space with energy concentrated wherever the constructive interference condition is satisfied, and subsequently forming light beams of high directional gains in those directions, therefore, realizing beam-forming; by changing the phase relation between the wave sources, the interference pattern can be changed, and light beams are now formed in a set of different directions of the far field, otherwise speaking, beam-steering is now achieved.

Over the last decade, with the development of silicon-based optoelectronics, more and more optical devices can be integrated on the silicon-on-insulator (SOI) platform. By virtue of a high refractive index contrast between the its core the its cladding layer, the silicon-based waveguide can support compact and complex passive device integration with a very small bending radius and a small footprint; by means of thermo-optic (TO) effect or free carrier dispersion (FCD) effect, a silicon-based phase shifter can realize phase shift of $\pi$ or even several $\pi$ with relatively low power consumption; by means of the periodically etched grating structure, guided modes in the waveguide can scatter into free space and form directional wave beams by coherent interference. Meanwhile the silicon nitride material, which is also compatible with the complementary metal oxide semiconductor (CMOS) process, is introduced to form a three-dimensional integrated photonic circuit system on the silicon platform. Due to its merits of high power threshold, low sensitivity to fabrication error, low loss, more degrees of freedom can be exploited for PIC design with silicon nitride, and the advantages of both the traditional SOI platform and the silicon nitride platform can complement each other. Finally, the CMOS compatible silicon-based photonic chip can realize incomparable cell granularity at a more competitive cost compared to its liquid crystal counterpart by virtue of the accumulated investment of the semiconductor electronic industry in the fabrication process.

Therefore, there is a growing interest in silicon-based optical phased array technology in the field. Since researchers from Interuniversity MicroElectronics Center (IMEC) of Ghent University proposed the hybrid architecture, i.e., the architecture that combines wavelength tuning and one-dimensional phased arrays for 2 dimensional beam-steering, in Optics Express, Vol. 34, No. 9, pp. 1477-1479, 2009, major development has been achieved in the field. The capability to form arbitrary patterns in the far field was demonstrated by groups from Massachusetts Institute of Technology in Nature, Vol. 493, pp. 195-199, 2013 based on a large-scale two-dimensional passive nanophotnic array, and the tolerance to the process error and the flexiblity of beam forming were thus verified by experiments. In 2015, as disclosed in Optics Express, Vol. 23, No. 5, pp. 5861-5874, the research team at U.C. Santa Barbara, reported a two-dimensional optical phased array transmitter integrated with an on-chip light source based on their heterogeneous silicon photonic platform. Being the most complex and densest integrated optical chip at the time, the transmitter represented a milestone towards the fully integrated on-chip LiDAR. In 2016, INTEL published a high-performance aliasing-free sparse phased array on the SOI platform in Optica, Vol. 3, No. 8, pp. 887-890, 2016, which made a significant breakthrough in scanning range and number of resolvable points. The beam divergence reached 0.14° on both rotation axes, which approached the resolving ability of optical collimation systems deployed in traditional scanning LiDARs. In 2017, MIT scientists demonstrated ultra-large-scale passive phased arrays (Optics Letters, Vol. 42, No. 1, pp. 21-24, 2017) on the silicon nitride platform and a silicon-integrated LiDAR system (Optics Letters, Vol. 42, No. 20, pp. 4091-4094, 2017) based on the frequency modulated continuous wave (FMCW) detection method, wherein the former renewed the record of beam divergence, reaching 0.02°, and the latter realized integrated transceiving in a paraxial arrangement and also incorporated a photodetector based on germanium-silicon, but there is no on-chip light source in this work. The year 2018 witnessed various development in both journal papers and conferences presentations, in the forms of large-scale antennas which were implemented by depositing silicon nitride directly on silicon (*European Conference on Optical Communication (ECOC)*, DOI: 10.1109/ECOC.2018.8535530; Optics Express, Vol. 26, No. 3, pp. 2528-2534, 2018), automated sparse array designs (Optics Express, Vol. 26, No. 15, pp. 19154-19170, 2018) and dynamic on-chip calibration (Optics Express, Vol. 26, No. 3, pp. 3199-3210, 2018); in the same year, the optical phased array patent (WO/2018/125403) of INTEL was officially published, and the design proposed that a plurality of sub-arrays with inter-array vernier differences were synthesized into a transmitting array, and the interferences of different sub-arrays were staggered by virtue of the vernier effect so as to undermine the constructive interference condition at grating lobes other than the main lobe and subsequently realize aliasing-free beamsteering. It should be noted that the resolution and noise suppression were additive rather than multiplicative in the present invention. In addition, similar to the sparse array, the solution will improve the noise floor of the transmitter, limiting the signal to noise ratio budget on the angular imaging aspect. Finally, chinese patents on optical phased arrays or laser phased arrays began to increase since 2018. CN201810240144 entitled "A Single Wavelength Multiline Scanning System Based on Thermo-Optical Switches and Silicon Optical Phased Arrays" disclosed the use of the thermo-optical switches to route the output light to sub-arrays with different grating periods to achieve multi-line 2-D scanning based on a single wavelength. Although the use of wavelength tunable lasers was avoided in this solution, to maintain the desirable beam divergence as the number of lines increase, the switch size, the number of subarrays, the on-chip insertion loss and the overall complexity of the control circuit still become serious problems, while the adoption of a optical switch will limit the overall output power; and in addition, the relevant design does not provide a corresponding receiver; "Integrated Delay-line Network Based on Wavelength Division Multiplexing for Multi-beam Optical Phased Array" (CN201810424574) and "A Silicon Integrated Multi-beam Optical Phased Array Antenna" (CN201810695911) showcase the implementation of multi-beam optical phased arrays from two technical paths respectively, but these works mainly focus on how to design the photonic circuits feeding power to the optical phased array so as to achieve more complex beam control functions, and the constitute forms of optical phased array and the structure of LiDAR system are not given in detail. CN201810619456 entitled "Metal-slot-waveguide-based Optical Phased Array Chip Transmitting End" and CN201810558205 entitled "Wide-range Scanning Broadband Laser Phased Array System" adopt different photonic antennas and coupling-suppressed designs to shrink the spacing of photonic antenna to half to one wavelength. Therefore, the integration density of the antenna on the transmitting-end is improved, large-range aliasing-free beam-steering is realized. Nevertheless, since the beam divergence of the phased array is inversely proportional to the total size of the phased array, the total number of the high-density integrated photonic antennas can reach thousands to tens of thousands in order to compete with the fine far-field resolution provided by traditional space optical collimation, and the complexity of the control circuit and the burden on the realtime processing power of the upper computer are greatly increased. Earlier CN 201611027155 entitled "Photonic Integrated Active Optical Phased Array Chip and Its Fabrication Procedure" mainly introduces the fabrication process of photonic phased arrays based on III/V platform. Because the refractive index difference between the core layer and the cladding layer of the III/V platform waveguide is typically much smaller than that of the silicon platform, the waveguide mode distribution is wider and less confined in the geometric boundary of the waveguide, the device size and bending radius are larger, and the inter-channel coupling is more serious, and the cost per unit area of the III/V wafer is relatively high to integrate large scale on-chip system. Generally speaking, the theoretical performance of III-V OPAs are limited in terms of the chip design, and there is no significant advantage in scaled manufacture.

In summary, although the OPA-based LiDAR has attracted a significant amount of attention, several fundamental problems remained unsolved. As far as the platform is concerned, the power threshold of silicon waveguide is limited by the two-photon absorption phenomenon (TPA), and it is difficult to support the high transmitting power required by long-distance LiDAR application; meanwhile, the silicon nitride photonic platform lacks widely-available dynamic tuning components with low power consumption, and only some passive array components or static arrays for technical demonstrations are reported; as previously mentioned, the III/V platform is currently not suitable for the design and fabrication of optical phased arrays in terms of performance and cost while the heterogeneous design based on bonding of III-V materials on the silicon platform still suffers from yield, reliability and heat dissipation issues; some work reports discrete components on a multi-layered platform, which may have various reference values in the sense of scientific research, but is not necessarily applicable to system applications in the field. Therefore, the chip system based on the multilayer silicon/silicon-nitride platform design in the present invention does not exist in the existing working content up to the first submission of this patent, and the completeness of the LiDAR system and the transceiving flexibility based on the vernier-effect in the present invention are rarely achieved.

SUMMARY OF THE PRESENT INVENTION

To overcome the obstacles in the existing technology, the present invention provides a chip-scale silicon-based hybrid-integrated LiDAR system, which is a opto-electric system based on the three-dimensional integration of silicon/silicon-nitride photonic platform compatible to the standard CMOS process and the hybrid integration of external gain chip based on III/V materials. Specifically, with the aid of integrated optical circuit and integrated electric circuit, this invention provides the following solution for LiDAR application, the implementation of on-chip tunable light source based on external cavity laser (ECL), the flexible beamforming and beam steering based on OPA, the coaxial-transceiving based on the reciprocity of light and the on-chip integrated coherent detection on the basis of silicon CMOS process; by ad-hoc package with electric controllers, the system-on-chip LiDAR in this invention can perform specific task under specific scenario to provide LiDAR data. The present invention has advantages in the aspects of scanning speed, manufacture cost, overall power consumption, system size and the like, and has high application value.

The present invention provides a chip-scale silicon-based hybrid-integrated LiDAR system, comprising a transmitting end (Tx), a receiving end (Rx) and a backup receiving end (Bk), wherein the transmitting end sequentially comprises a hybrid-integrated narrow-linewidth tunable laser module (101), a silicon-nitride-integrated beam splitter module (102) a silicon-integrated phase shifter array module (103) and a silicon-nitride-integrated unidirectional transmitting antenna array module (104) w.r.t the optical path; the receiving end comprises a silicon-nitride-integrated unidirectional receiving antenna array module (201), a silicon-nitride-integrated beam splitter module (202) and a silicon-integrated coherent receiving module (203), and the backup receiving end sequentially comprises a spatial optical module (301) and an off-chip coherent receiving module (302) w.r.t the optical path; the electric control of the hybrid-integrated narrow-linewidth tunable laser module (101) and the phase shifter of the silicon-integrated phase shifter array module (103) at the transmitting end and the signal processing of the silicon-integrated coherent receiving module (203) at the receiving end are implemented by a piggybacked high-speed integrated circuit module outside the photonic chip system on a ad-hoc basis.

In the chip-scale silicon-based hybrid-integrated LiDAR system of the present invention, the laser module simultaneously provides detection light and reference light required by the coherent LiDAR, the detection light input by the bus waveguide is evenly distributed in power by the beam splitter module into N paths of waveguides, passes through the phase shifter array with N channels, and finally leaves the chip system from the N-channel unidirectional transmitting antenna array and enters free space to illuminate the target, and N is greater than or equal to 4; at the receiving end, a reference light input by the corresponding bus waveguide evenly distributed in power by the beam splitter module into M channels of waveguides, meanwhile, the signal light reflected by the target is coupled into the M-channel unidirectional receiving antenna array into the chip system, the M-channel reference light from the beam splitter module and the M-channel signal light from the receiving antenna array module are coherently combined in the coherent receiving module to generate the electrical signal containing the target distance information, M is greater than or equal to 4, and M and N may not be equal in the specific implementation.

In the present invention, in a spherical coordinate system with the central line of the array defined as the axis, optical signals on each antenna undergo corresponding delay by setting the proper phases using the phase shifter array, radiation fields of the optical antennas are coherently combined in the free space, and a directional beam is generated at a specific longitudes/azimuths in the far field; by changing the phase relation between the channels, the aforementioned beam with high directivity can be formed in another longitude; and by analogy, it is possible for angular beam-steering between different longitudes/azimuths in the free space.

In the present invention, the unidirectional transmitting antenna in the unidirectional transmitting antenna in the unidirectional transmitting antenna array (104) is implemented by a multilayer etched silicon nitride waveguide grating structure; Periodic refractive index perturbation on the grating scatters the guided mode in the waveguide into free space and is introduced via etching; each grating period comprises two perturbations with different grating strengths; the suppression ratio of upward emission to downward emission are realized by optimizing the etching depth and the relative position of the perturbations and subsequently maximize upward constructive interference and downward cancellation. On this basis, the grating antenna is equivalent to a passive phased array with a linear optical path difference. Since the layout direction of the antenna is perpendicular to the arrangement direction (central line) of the antenna array, determined by a similar coherent combining process, a directional beam is formed at a specific latitude/elevation in the far field; by changing the wavelength input to the transmitting end, the linear optical path difference between scattering elements of the antenna yields a different progressive phase shift, and subsequently a directional beam is formed at another latitude/elevation; and by analogy, angular beam-steering can be achieved between different latitudes/elevations in the free space.

In the present invention, the final far-field angular distribution of the transmitting end is a beam in the direction of the longitude/azimuth and latitude/elevation intersection point obtained by interference of the radiation fields of the unidirectional antenna array, in other words, optical power injected into the transmitting end is concentrated in one directional beam with extremely high directional gain; and by adjusting the phase relationship between the channels in the transmitting end and the operating wavelength of the laser, the light beam can be projected into the free space at an arbitrary direction in the hemisphere centered on the chip, and the available FOV is dependent on the specific design. In terms of radiometry, the above direction can be expressed as a specific solid angle; if a target with a certain distance from the LiDAR system exists on this solid angle, a part of the optical signal reflected by the target returns as a spherical wave with almost no directivity; however, based on the principle of reciprocity of light propagation, strong rejection of other directions or directional selectivity can be achieved at the receiving end by matched phases in the coherent receiving module; and the distance from the target to the chip system can be obtained by means of the specific conversion relationship under the current LiDAR system detection scheme.

In the present invention, although the receiving end receives reflected light from the solid angle of the illuminated target based on the principle of reciprocity of light propagation, the array of the receiving end is not necessarily a mirror of the array in the transmitting end. In different embodiments, a group of Tx and Rx arrays with vernier difference, a group of arrays with different antenna numbers (N, M) or different array geometric parameters, or even a group of arrays with different transceiving antenna units can be adopted to achieve more complex, flexible and refined detection function. Obviously, since the whole detection process is a directional synthesis of the transmitting end and the receiving end, the solution provides more degrees of freedom for the system design, and also can significantly improve the overall performance of the system.

In the present invention, the hybrid-integrated narrow-linewidth tunable laser module comprises two main parts, which are a tunable external cavity laser and an optical signal amplifier. The tunable external cavity laser comprises a gain chip and a silicon nitride tunable external cavity, and the gain chip is a reflective semiconductor amplifier (RSOA) chip processed from III/V materials; the filtering part of the silicon nitride external cavity adopts a double micro-ring resonator structure with a vernier effect, and the reflecting part of the external cavity adopts an integrated loop mirror structure with adjustable reflectivity; the gain chip and the external cavity together form a laser, and filtering and reflection characteristics of the external cavity are tuned with thermo-optic or piezoelectric deformation means so that a narrow linewidth laser signal with adjustable wavelength and amplitude is input into the subsequent amplification chip.

In the present invention, the optical amplifier may employ a one-stage to multi-stage cascaded transmission-type semiconductor optical amplifier, and a specific amplifier chip may employ, but not limited to, a typical III/V integrated semiconductor amplifier.

In the present invention, the gain chip and the optical signal amplifier chip are hybrid-integrated by horizontal coupling with the silicon nitride waveguides, meanwhile, the input and output ports of the amplifier chip are required to be arranged on the same side to facilitate hybrid integration.

In the present invention, the optical amplifier structure finally re-inputs the high-energy narrow-linewidth laser into the silicon nitride waveguide, the energy is subsequently distributes to the transmitting end and the receiving end via an adjustable splitter, wherein most of the energy is supplied to the transmitting end as the detection light for target illumination; the remaining energy input to the receiving end is used as the reference light for coherent detection and can be routed to the in-chip receiving end or the off-chip backup receiving end by another adjustable splitter; and power monitoring means can be additionally configured on two bus waveguides of detection light and reference light as required after the energy distribution, and the feedback can be used to tune both the amplifier and the adjustable splitter for proper energy distribution.

In the present invention, the beam splitter module described may be implemented by using, but not limited to, passive beam splitting structures such as a cascaded multi-mode interferometer, a star coupler, and the like.

In the present invention, the phase shifter array module can adopt a typical phase shifter design such as, but not limited to, a high-speed thermal-optic phase shifters, an electro-optic phase shifters and the like, and the control of driving voltage of the phase shifters is implemented by adopting a CMOS digital-to-analog converter integrated in the photonic chip, or a CMOS digital-to-analog converter on another chip co-integrated with the photonic chip using multi-chip package, and the digital-to-analog converter is connected with the main control circuits by high-speed electrical connections In the present invention, the unidirectional transmitting/receiving antenna array module comprises silicon nitride unidirectional antennas arranged in an array, and the antennas adopt a multilayer etched silicon nitride waveguide grating structure.

In the present invention, overlapping tapers for evanescent coupling are adopted between the silicon-based and the silicon-nitride-based optical waveguides to achieve coupling between different layers in a three-dimensional integrated chip, and the layout adopts the specification where adjacent layers are used for coupling while overlapping structures and crossings will be handled on every other layer.

In the present invention, the coherent receiving module uses a Germanium-Silicon balanced detector to simultaneously receives the reference light and the signal light, and to achieve coherent reception with high directional gain and common mode rejection by performing matched phase shift on the reference light, whereby signal-to-noise ratio is improved and the electric signal containing the phase shift or the frequency shift dependent on the specific detection scheme is output to a signal processing module to retrieve the distance and/or speed information of the target illuminated by the detection light.

In the present invention, the space optical module condenses plane waves propagating in the free space by a large numerical aperture lens system, and couples the light into an optical fiber for delivery to the off-chip detector module.

In the present invention, the off-chip coherent detection module obtains the signal light from the spatial optical module and the reference light from the on-chip adjustable splitter output port via optical fiber connection, and subsequently performs photodetection in a balanced detection mode, and transmits the electric signal to the signal processing module to retrieve the distance and/or speed information of the target illuminated by the detection light.

In the present invention, the high-speed integrated circuit module can be implemented by adopting a typical integrated circuit such as a field-programmable gate array (FPGA), an application-specific integrated circuit (ASIC) and the like; all electro-optical control and photodetection will be completed in the transmitting end and the receiving end, only electrical connections exist between the chip system provided by the present invention and the high-speed circuit module, and the chip system and the high-speed circuit module can be subjected to opto-electric hybrid packaging by adopting either a multi-chip module (MCM) package or a system in a package (SIP) or others.

Compared with the prior art, the present invention has the beneficial effects mainly embodied in the following aspects.

1. According to the present invention, no moving part is contained, the scanning speed which is three to four orders of magnitude higher than that of the traditional mechanical solutions and can be supported by giving an electric interconnection with the same bandwidth. Further improvement of the scanning speed can be realized relying on the development of modulation technology in the optical communication field, and a better tradeoff can be achieved w.r.t. power budget, instantaneous bandwidth, scanning linearity and the like thanks to photonic integration. Meanwhile, as an strictly-solid-state device, mechanical abrasion does not exist in the system, and stable operation can be maintained in a scenario with rapidly changing acceleration.

2. According to the present invention, a phased array technology is used, arbitrary beamforming at any angle within the FOV is supported while any the directions of sequential scans can change abruptly in a non-casual fashion. By exploiting such flexible characteristics of the beam-steerer through the configuration of a sparse searching mode where only target of interests are tracked actively, the speed advantage can be further consolidated. In addition, the present invention has the characteristics of coaxial integrated phased array transceiving based on the reciprocity of light, beamforming loss is reduced and the directional selectivity is multiplied.

3. According to the present invention, the silicon/silicon-nitride three-dimensional-integrated chip is compatible with the CMOS process, and by means of the mature process of the semiconductor industry, the cost of the chip can be remarkably reduced at the manufacturing phase; the III/V gain chip and the amplifier is mature in technology, low in cost, stable in performance and is arranged at the edge of the photonic circuits where dedicated thermal control can be supplemented, the thermal stability of the optical gain thereof is higher than that of other hybrid integration means, and the thermal crosstalk to the beamforming system is lower.

4. The present invention has a compact size, and completely integrates laser tuning, electro-optical control and photodetection in the LiDAR system. Only electrical interconnection exists between the system and the processing unit. With standard packaging, the chip system can be integrated in a circuit board where the processor and corresponding drivers are located and can be further co-integrated with other sensor chips such as an electronic gyroscope, a barometer and the like. The LiDAR system can even be packaged into a plug-and-play intelligent hardware, providing data for various devices on an ad-hoc basis.

BRIEF DESCRIPTION OF THE DRAWINGS

FIGS. 2A and 2B show the detection modes available for ranging purposes of the chip-scale silicon-based hybrid-integrated LiDAR system of the present invention, wherein FIG. 2A shows the pulse-based time-of-flight method and FIG. 2B shows the frequency modulated continuous wave method thereof.

FIGS. 3A and 3B are flow charts detailing the operating procedures under aforementioned detection modes of the chip-scale silicon-based hybrid-integrated LiDAR system of the present invention, wherein FIG. 3A shows the flow chart of the time-of-flight method and FIG. 3B shows the flow chart of the frequency modulated continuous wave method.

FIGS. 4A and 4B show the operating principles of phased array beamforming and vernier transceiving in the present invention, wherein FIG. 4A shows the coherent beam combining of an optical phased array, and FIG. 4B shows the directional multiplication of vernier transceiving.

FIGS. 5A, 5B and 5C show one embodiment of the present invention employing a group of coaxial vernier transceiving arrays, where FIG. 5A shows the front view, FIG. 5B shows the side view, and FIG. 5C shows the perspective view.

FIGS. 6A, 6B, and 6C show an inter-layer coupler of the silicon/silicon-nitride multilayer platform in one embodiment of the present invention, where FIG. 6A shows the top view, FIG. 6B shows the side view, and FIG. 6C shows the perspective view.

FIGS. 7A, 7B, and 7C show a III/V gain chip and silicon/silicon-nitride chip horizontal coupling structure in one embodiment of the present invention, where FIG. 7A shows the top view, FIG. 7B shows the side view, and FIG. 7C shows the perspective view.

FIGS. 9A and 9B show the structure and operation principle of the silicon-nitride-integrated vernier micro-ring-filter in one embodiment of the present invention, where FIG. 9A shows the structure and FIG. 9B shows the transmission spectra thereof.

FIGS. 11A and 11B show the silicon-nitride-integrated beam splitters in one embodiment of the present invention, wherein FIG. 11A shows the cascaded multimode interferometer structure, and FIG. 11B shows the star coupler structure.

FIGS. 13A and 13B show unidirectional transmitting/receiving antenna array module in one embodiment of the present invention, wherein FIG. 13A shows the silicon nitride unidirectional receiving antenna array module on the lower layer, and FIG. 13B shows the silicon nitride unidirectional transmitting antenna array on the upper layer.

Figure 1:
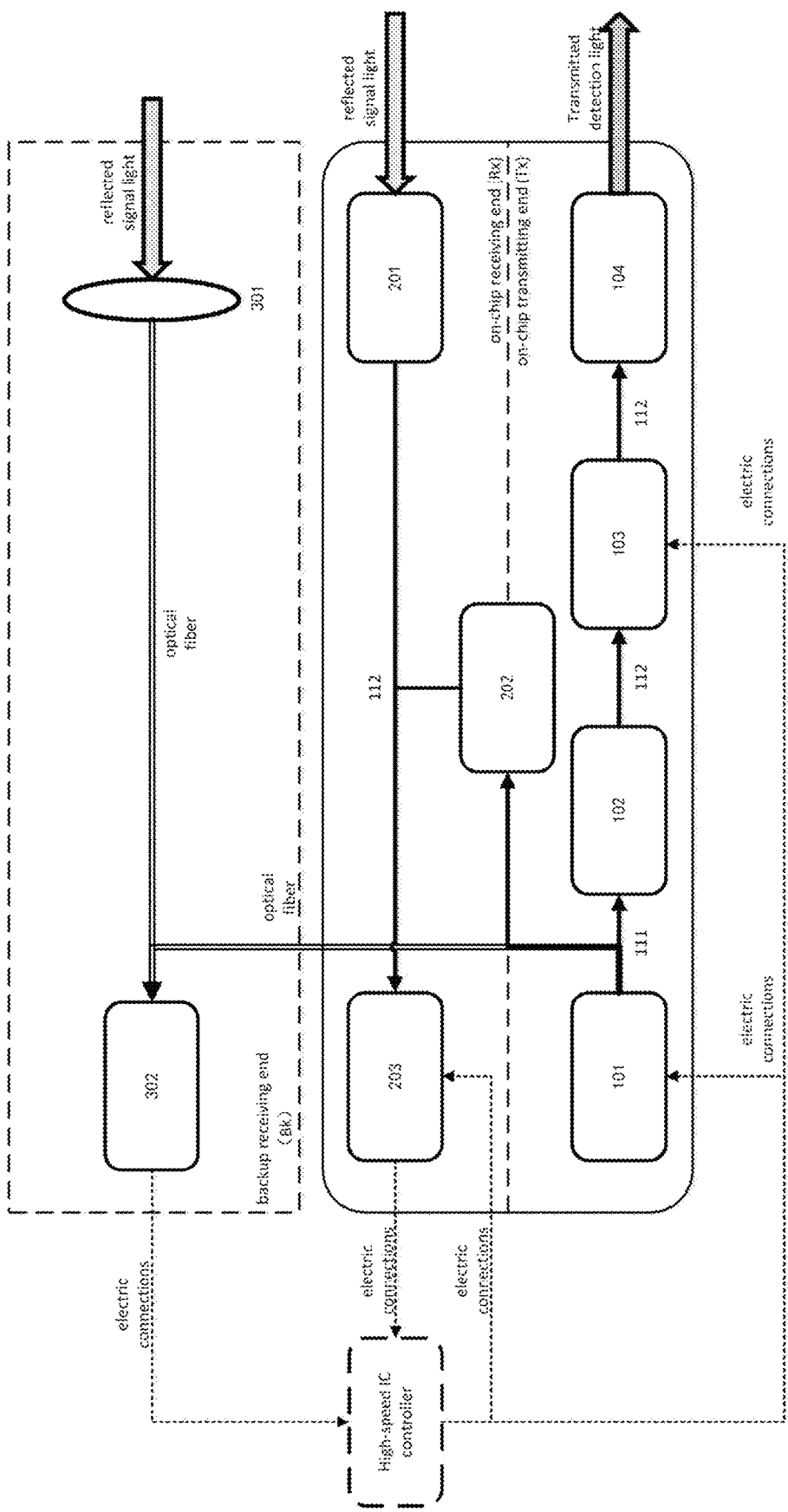
FIG. 1 is an architecture diagram showing the chip-scale silicon-based hybrid-integrated LiDAR system of the present invention.

Reference numbers in the figures are referring to the following:
101—hybrid-integrated narrow-line width tunable laser source module; 102—silicon-nitride-integrated beam splitter module; 103—silicon-integrated phase shifter array module; 104—silicon-nitride-integrated unidirectional transmitting antenna array module; 111—silicon nitride waveguide; 112—evanescent inter-layer coupler;
201—Silicon-nitride-integrated unidirectional receiving antenna array module; 202—silicon-nitride-integrated beam splitter module; 203—silicon-integrated coherent receiving module;
301—spatial optical module;
310—3D LiDAR under the pulse-based TOF detection mode; 311—the controller controls the optical switch to split the output laser between the on-chip transmitting end and the off-chip backup end; 312—the controller closes the optical aperture in the spatial optical module of the off-chip backup end so that the backup end is prepared to receive the reference light in order to restore the original pulse modulation code; 313—the controller directly modulates the reflectivity of the tunable mirror in the ECL according to the required pulse amplitude coding to generate the modulated pulse train; 314—the controller outputs voltages stored in the lookup table to the tunable laser source, so that the resonance wavelength meets the beam forming condition at the current elevation angle; 315—the controller outputs the voltages stored in the lookup table to the phase shifter array, so that the channel phases meet beam forming conditions at the current azimuth angle; 316—the integrated phased array directionally transmits and directionally receives the pulse-coded signal light; 317—the on-chip receiving module performs photoelectric conversion on the received signal light to obtain the delayed coded pulses (note that the reference pulse is output to the backup end, so the module is operating as an array of photodetectors for incoherent detection); 318—the controller compares the coded pulse at the backup end with the coded pulse at the on-chip receiving end to obtain the time delay through autocorrelation operation and convert the time delay into distance; 319—the aforementioned incoherent ranging process is accomplished at all resolvable points;
320—3D LiDAR under the frequency modulated continuous wave detection mode; 321—the controller controls the optical switch to split the output laser between the on-chip transmitting end and the currently desired receiving end; 322—if the backup end is used/not used, the controller opens or closes the aperture of the spatial optical system of the off-chip backup end according to the currently configuration to minimize interference; 323—the controller outputs voltages stored in the lookup table to the tunable laser source, so that the resonance wavelength meets beam forming condition at the current elevation angle; 324—the controller outputs the voltages stored in the lookup table to the phase shifter array, so that the channel phases meet beam forming condition at the current azimuth angle; 325—the controller generates the drive signal to rapidly tune the resonance wavelength with high-linearity to obtain the frequency modulated continuous signal light; 326—the integrated phased array directionally transmits the frequency modulated continuous wave signal light and performs directional receiving; 327—the coherent receiving module performs coherent detection on the received signal light and the reference light to restore the electric signal of a specific beat frequency containing the distance information; 328—the controller analyzes the spectrum of the electric signal and restores the distance; 329—the aforementioned incoherent ranging process is accomplished at all resolvable points;
421—spatial spectrum of the transmitting array; 422—spatial spectrum of the receiving array; 423—the phase relationships of the Tx and Rx arrays are adjusted to align at the target beam-steering angle; 424—the detection result of the vernier transceiving process is the product of the transceiving spatial spectrums; 425—Note that both aliasing and side-lobes are suppressed and the angular resolution is improved due to the multiplication;
921—transmission spectrum of micro-ring (a); 922—transmission spectrum of micro-ring (b); 923—transmission spectrums of the two rings are adjusted so that two peaks are aligned at the operating wavelength; 924—transmission spectrum of the cascaded vernier rings is the product of the transmission spectrums of the two rings * (* thus further compressing the line-width).

DETAILED DESCRIPTION OF THE INVENTION

The present invention is described in details with reference to the drawings and embodiments. The specific embodiments are for illustration purposes and are not intended to limit the scope of the present invention. Generally, the technical features involved in various embodiments can be combined with each other as long as they do not conflict with each other in principle.

Referring to FIG. 1, a chip-scale silicon-based hybrid-integrated LiDAR system comprises three main components: a transmitting end Tx, a receiving end Rx and a backup receiving end Bk; the transmitting end comprises a hybrid-integrated narrow-linewidth tunable laser module 101, a silicon-nitride-integrated beam splitter module 102, a silicon-integrated phase shifter array module 103 and a silicon-nitride-integrated unidirectional transmitting antenna array module 104; the receiving end comprises a silicon-nitride-integrated unidirectional receiving antenna array module 201, a silicon-nitride-integrated beam splitter module 202 and a coherent receiving module 203; the backup receiving end comprises a spatial optical module 301 and an off-chip coherent receiving module 302; the electric control of the hybrid-integrated narrow-linewidth tunable laser module 101 and the phase shifter of the silicon-integrated phase shifter array module 103 at the transmitting end and the signal processing of the silicon-integrated coherent receiving module 203 at the receiving end are implemented by a piggybacked high-speed integrated circuit module outside the photonic chip system on a ad-hoc basis.

Figure 2B:
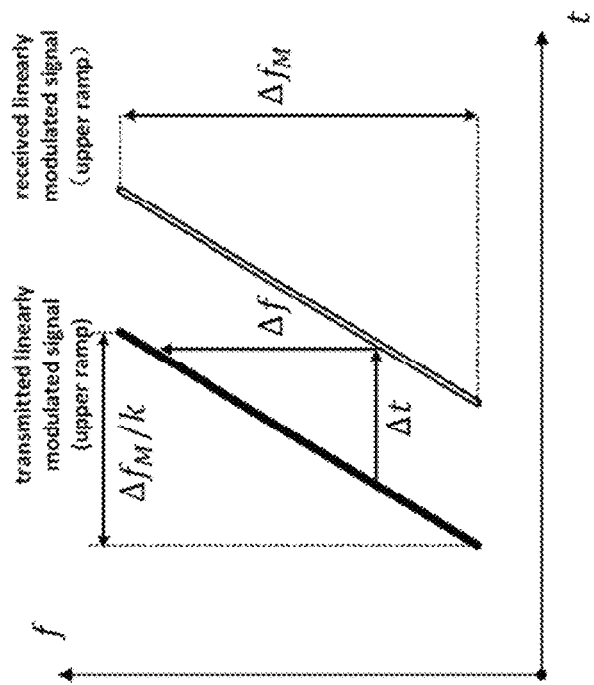
Figure 2A:
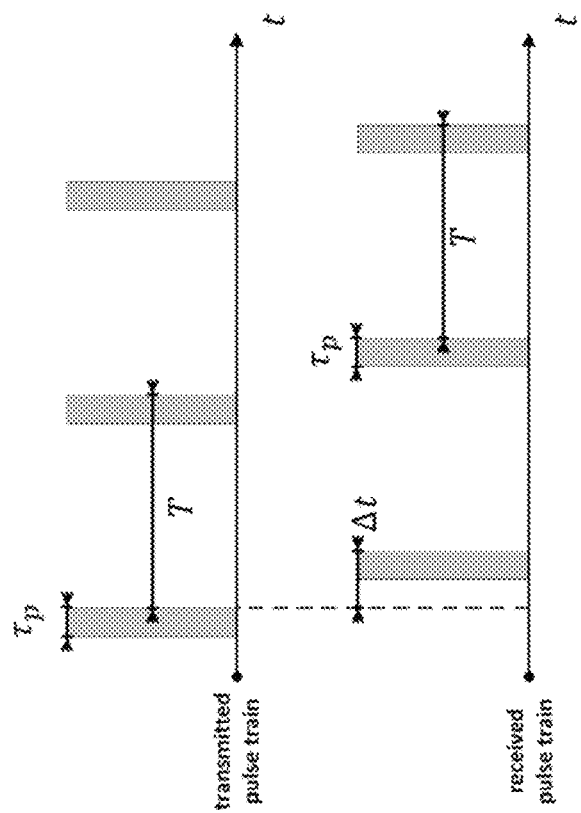
Figure 3B:
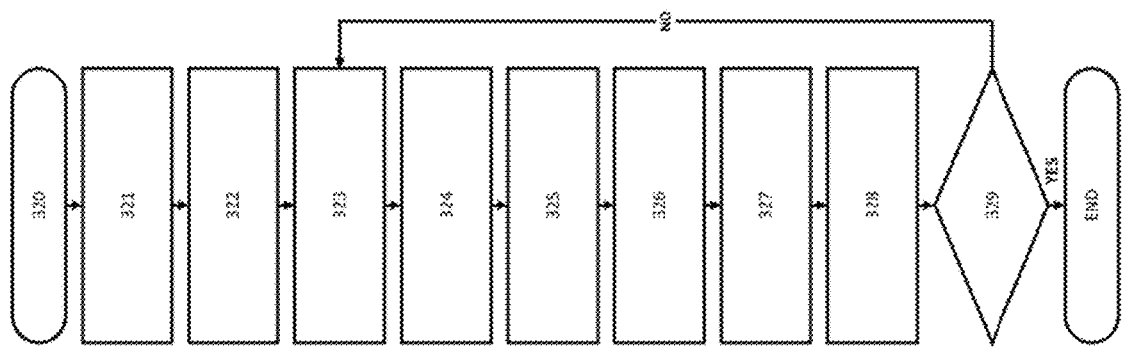
Figure 3A:
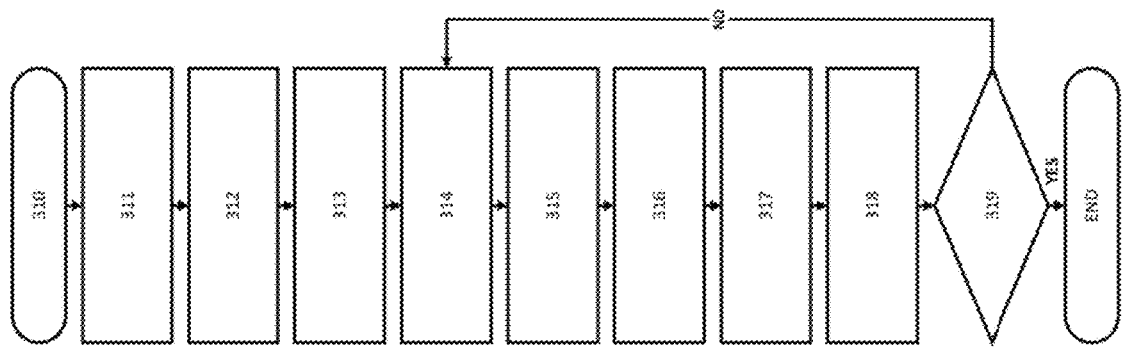

As shown in FIGS. 2A and 2B, the chip system supports both the two mainstream detection and ranging method, namely the pulse-train-based TOF scheme as shown in FIG. 2A and the frequency modulated continuous wave scheme as shown in FIG. 2B. The pulse-based method changes the net-gain of the lasing mode by adjusting the reflectivity of the external cavity of the integrated tunable laser source, and subsequently directly modulates the lasing condition of the laser, which not only allows 0/1 modulation of the laser to obtain optical pulses, but also allows pulse coding by means of electric sequence coding. After being amplified and coherently transmitted, the modulated light illuminates the target, a part of the reflected light returns along the original optical path, and is received with high directivity and converted into an electric signal by the optical detector. It is emphasized that in the pulse mode, the optical switch at the integrated light source routes the reference light off-chip to the backup receiving end, and both the on-chip and off-chip balanced detectors are in a single-end input state, i.e. used as a common detector; at the same time, the shutter in the spatial optical module in the backup end remains closed so the PD in the Bk receives only the reference light. The temporal difference between the optical signals, i.e. the signal light and the reference light, can be extracted by performing autocorrelation operation on the electric signal obtained at the on-chip receiving end and the off-chip end. Further calibration may be applied to deduct the transmission time in the chip circuits and fibers and to subsequently restore the actual round-trip transmission time in the free-space, and finally retrieve the distance of the target from the LiDAR system according to the round-trip time. In principle, if the pulse width is $\tau_p$, the pulse interval is T, and the round trip time is $\Delta t$, the measurement distance R, the minimal resolvable distance $\Delta R$, and the maximum aliasing-free ranging distance $R_{amb}$ of the form are as follows:

$$R = 0.5c\Delta t$$

$$\Delta R = 0.5c\tau_p$$

$$R_{amb} = 0.5cT.$$

In the above equations, c denotes the speed of light, and the coefficient 0.5 reflects that the actual propagation distance of light is twice the distance between the target and the LiDAR. In order to improve the ranging resolution $\Delta R$, i.e. to better separate and recognize individual targets in terms of distance measurement, pulse-based LiDAR systems tend to employ pulses of sufficiently fine/small width $\tau_p$. If the ratio between the pulse width and the time interval is regarded as the duty cycle of the pulse train, improving the resolution by shortening the pulses is equal to reducing the duty cycle.

Taking into account the property of Fourier transform, compressing the pulse duration in the time domain corresponds to extending the spectrum of the pulse in the frequency domain, which increases the noise associated with the system bandwidth. When the signal-to-noise ratio required by the detection is certain, w.r.t. the same target, the peak power of the transmitted pulse is required to be further improved. Overall, it places higher requirement on the power handling/threshold of the transmitter and larger bandwidth is required at the receiving end.

In terms of radiometry, the total energy radiated by the system is certain when the current detection reaches a desired signal-to-noise ratio. Since the pulse duration is inversely proportional to the bandwidth, the peak power at a given signal-to-noise ratio is directly proportional to the bandwidth.

Therefore, it is theoretically possible to reduce the peak power regrading both the bandwidth-associated noise and the energy conservation, if a smaller pulse bandwidth can be used. The frequency modulated continuous wave scheme is such a method that the peak power is reduced by pulse compression technology. And more generally speaking, the typical frequency modulated solutions remove the dependency of ranging resolution on the pulse duration, and directly modulate the chirped frequency range $\Delta f_M$, which breaks the aforementioned tradeoff.

In the present invention, the frequency modulated continuous wave scheme also performs imaging and ranging by coherent transmission and coherent reception. Different from the pulse-based scheme, the electric control signal changes the resonance frequency of the integrated tunable laser with high linearity in either a sawtooth-wave or a triangular-wave at high speed so as to obtain the frequency modulated continuous optical signal. Since the frequency of the light is significantly higher than that of the microwaves, it is not sufficient for wavelength modulation (e.g., operating wavelength at 1550 nm, a wavelength change of 0.01 nm, will introduce a frequency shift of approximately 1.25 GHz) to cause a significant phase shift in the photonic circuits given that there is no delay-line and all interlinking waveguides are of the same length. Therefore, the frequency modulation will have a limited affect on the directivity of coherent transmission and coherent reception (0.01 nm corresponding to an angle change of about $10^{-3\circ}$). As shown in FIG. 2B, the time delay between the transmitted signal and the received signal can be extracted from the beat frequency of the electrical signal, and the round trip time from the LiDAR to the target can be obtained through the same calibration process to compensate for on-chip and fiber transmission; taking the linear frequency modulation as an example, if the measured frequency change is $\Delta f$ and the frequency shift per unit time is k, the actual range R, the ranging resolution $\Delta R$ and the maximum aliasing-free ranging distance of the system are as follows:

$$R=0.5c\Delta f/k$$

$$\Delta R=0.5c/\Delta f_M$$

$$R_{amb}=0.5c\Delta f_M/k.$$

As previously mentioned, the solution can provide the same signal-to-noise ratio compared to the pulsed-based scheme with a lower peak power; in addition, due to the reduction of the system bandwidth and the reduction of the bandwidth-related noise, the average power of the solution is lower; finally, the continuous laser output facilitates power monitoring and correction of the laser. According to the present invention, the frequency modulated continuous wave scheme is used as the tracking mode for recognized targets of high interests and the pulse-based scheme is used for general detection. The system itself is compatible with both schemes and can be extend to support the combined schemes, namely the frequency modulated pulse scheme. Additionally, the triangular-wave FMCW or similar frequency modulated pulses can be used to extract the target speed based on the Doppler frequency drift, for example, if the up-ramp beat frequency is $f^+=f_R+f_D$ and the down-ramp beat frequency is $f^-=f_R-f_D$ where the $f_R$ is the ranging dependent frequency shift and the $f_D$ is the Doppler frequency shift, $$R = c(f^+ + f^-)/4k$$

$$v_r = \frac{\lambda}{2}f_D = \frac{\lambda}{4}(f^+ - f^-).$$

In the above formula $f_D$ is the Doppler frequency shift measured at a moment t, and is equal to the receiving frequency $f_R$ measured at the moment t minus the corresponding transmitting frequency $f_T$ before $\Delta t$;

$$f_D(t)=f_R(t)-f_T(t-\Delta t)s\cdot t\cdot R=0.5c\Delta t$$

and since the Tx and the Rx are located in the same chip system and both the transmitter and the receiver are static in the reference frame established w.r.t. the LiDAR itself, the relationship in the above formula can be simplified and a radial relative speed $v_r$ can be extracted. The formula has some approximations, and a lookup table can be calibrated in the specific implementation with higher precision requirements.

Figures 4A, 4B:
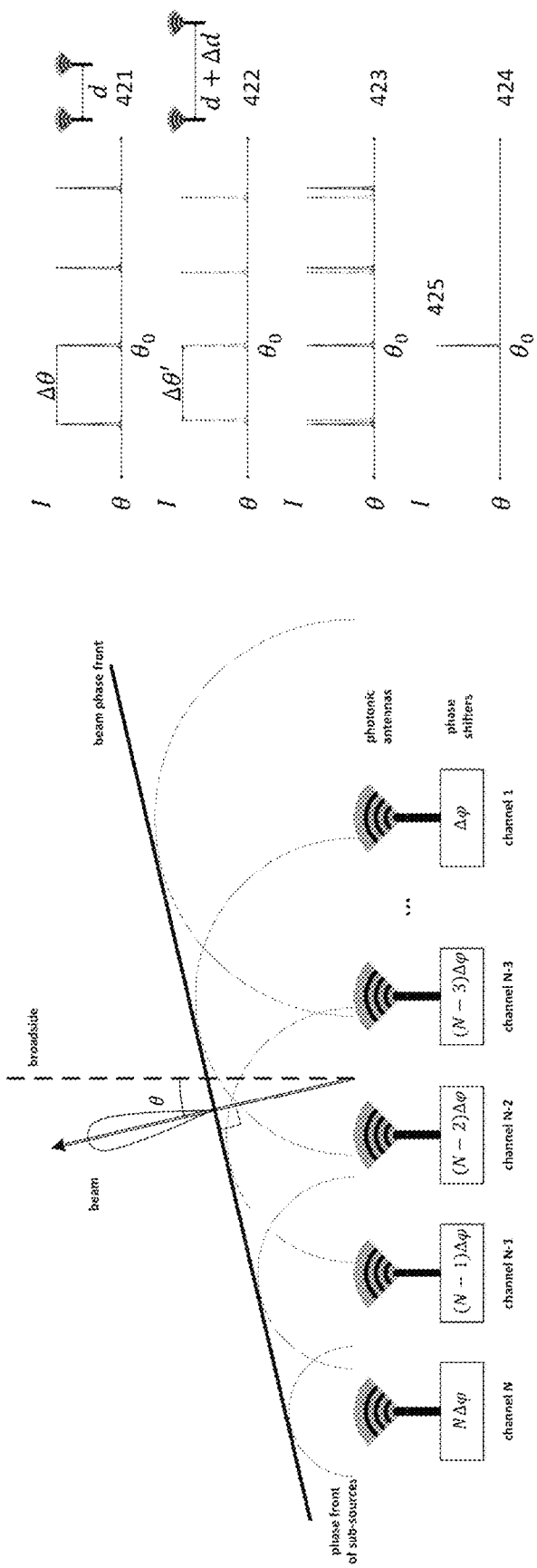

It is obvious that the above ranging scheme is only dependent on the modulation of the tunable laser, the operating states of the optical switch units attached to the laser source and the spatial optical module of the off-chip backup system, and is independent of the receiving and transmitting directivities. On this basis, the chip system relies on the phased array principle to perform beamforming and beam-steering to realize LiDAR imaging. A phased array is an array of coherent sources/antennas with stable phase relations. As shown in FIG. 4A, when the uniform one-dimensional phased array has a linearly progressive phase difference, the wavefront from each sub-source/antenna is coherently combined to form a directional beam. Similarly, the far-field interference pattern of a sparse or a 2-D phased array can be numerically calculated according to the geometrical and phase relationships of the sources/antennas.

Specifically, in the chip system in our invention, in order to reduce the complexity of the control circuit, beam-steering in the three-dimensional space is decomposed into the longitude/azimuth and latitude/elevation directions of the spherical coordinate system established on the central axis of the chip. Respectively the beam-steering in longitude/azimuth $\psi$ direction is implemented by the on-chip integrated multi-channel active optical phased array, and the latitude/elevation $\theta$ direction is implemented by combining a tunable laser and a grating antenna which can be rationalized as a passive phased array. In other words, an array of grating antennas can be decomposed into two one-dimensional phased arrays, while the final far-field beam formed by the array is the intersection of the longitude/azimuth and latitude/elevation beams. This runs parallel with flexible beam-steering and fast beamforming, and, as previously mentioned, is independent of the ranging scheme. Taking a one-dimensional uniform phased array as an example, if the progressive phase shift between the channels is $\varphi$ and the geometric interval is d, the beamforming angle at which the main beam of the one-dimensional uniform phased array resides can be given as:

$$\psi = \mathrm{asin}\left(\frac{\lambda\varphi}{2\pi d}\right).$$

At the same time, for a given uniform grating antenna, the grating period is Λ, and the effective index of the guided mode in the grating is $n_{eff}$; and when the incident wavelength is λ, an emission angle of the beam is $$\theta = \operatorname{asin}\left(n_{eff} - \frac{\lambda}{\Lambda}\right).$$

Figure 13A:
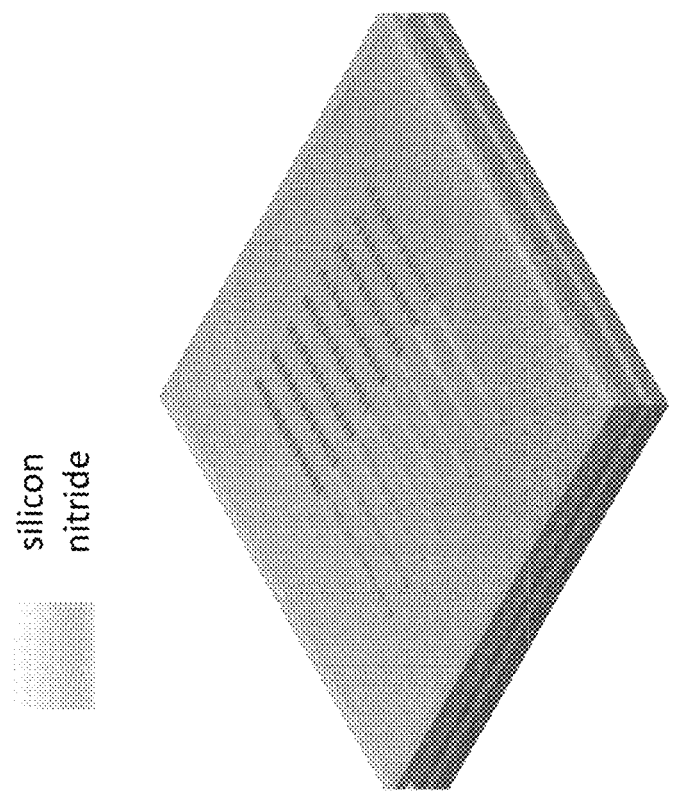

The beamforming performance corresponding to the non-uniform array or the antenna with apodization can be estimated referring to the above formula, and can also be accurately modeled by numerical calculation, which is not described in detail herein. In summary, an optical signal that passes through the phased array of the above architecture will form into a beam with high directivity and illuminates a target in the far field, and the reflected signal light is coupled back into the chip system by the unidirectional receiving antenna array with a structure as shown in FIG. 13A based on the principle of reciprocity of light propagation; or into the off-chip backup receiving end via the spatial optical module in paraxial arrangement with the chip. The former performs phase compensation on the reference light to realize directional reception; the latter has no directional sensitivity in reception, and its spatial optical system responsible for coupling the light into the fiber should be of as large a numerical aperture as possible. In particular, the receiving array and the transmitting array are organized in the form of a pair of coaxial vernier transceiving arrays as shown in FIGS. 5A to 5C, wherein the receiving array and the transmitting array have a vernier difference in antenna spacing so as to have a difference in the directivity. Since the entire detection process involves the intersection of the directivities of the Tx and Rx, the vernier transceiving array can further improve the resolution and eliminate the aliasing. The principle is shown in FIG. 4B.

And finally, the optical signal received by the receiver is subjected to photodetection to obtain an electrical signal, and the electrical signal leaves the chip system for processing by the processor. So far, the ranging schemes as well as their principles, and the beamforming and imaging process of the LiDAR system are summarized.

On the basis of the above solution, the embodiment chip system is implemented by hybrid integration between a silicon/silicon-nitride multilayer chip and two III/V gain chips. The multilayer platform chip and the evanescent inter-layer coupler used between the layers thereof are shown in FIGS. 6A to 6C, and the horizontal coupling between the III/V chip and the silicon nitride waveguide in the multilayer platform chip is implemented using the spot-size converter shown in FIGS. 7A to 7C.

Figure 8:
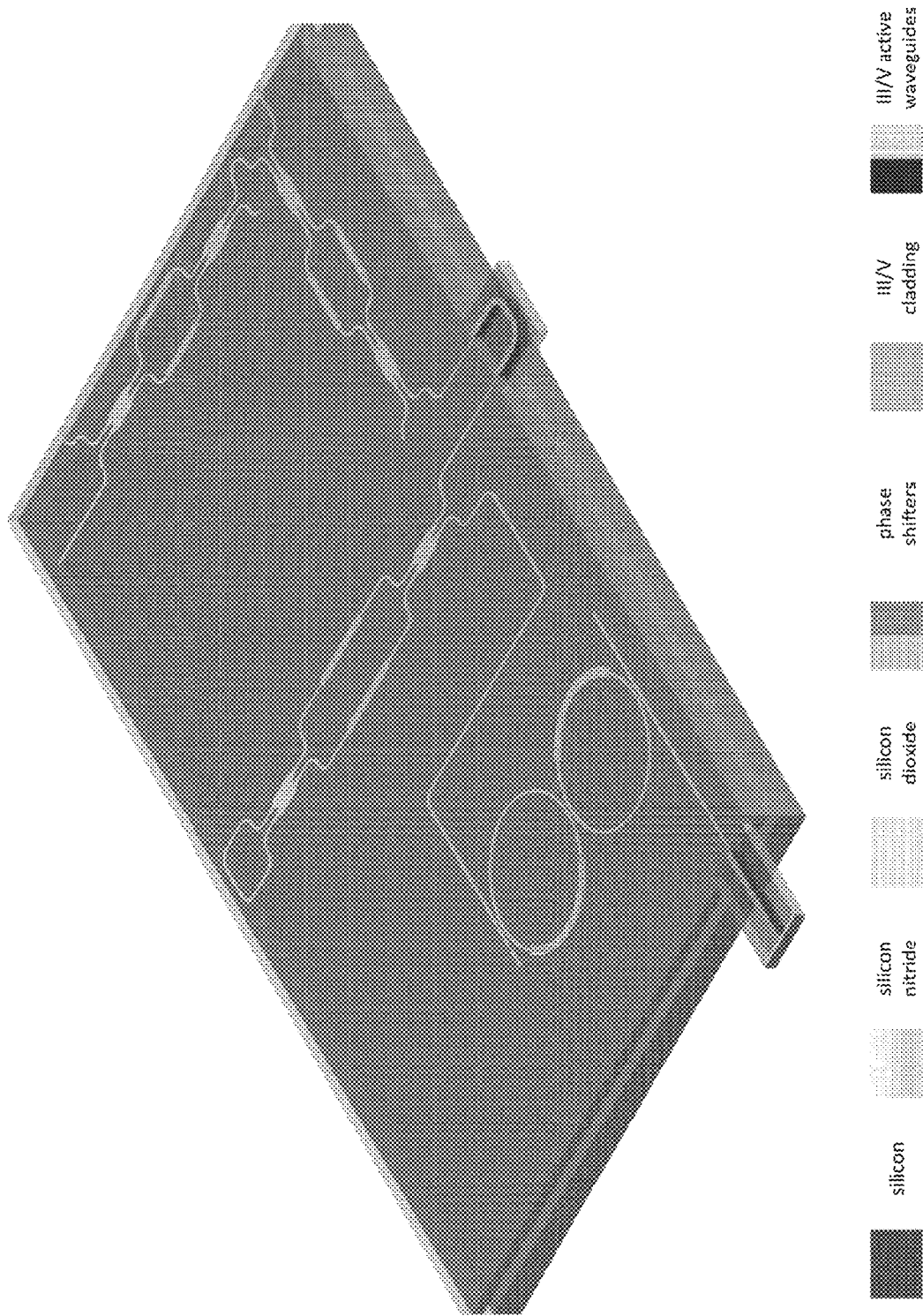
FIG. 8 is a schematic showing the hybrid-integrated narrow-linewidth tunable laser module in one embodiment of the present invention.

The hybrid-integrated narrow-linewidth tunable laser as shown in FIG. 8 consists of a reflection-type semiconductor optical amplifier (RSOA), an integrated silicon nitride external cavity, a transmission-type semiconductor optical amplifier and two subordinate optical switches for light splitting and routing. The RSOA realize population inversion by electric pumping and can provide optical-gain by virtue of the direct band-gap of the III/V material. Inside the RSOA, light is totally reflected at one end of the amplifier, and totally transmitted at the other end; a external cavity is formed by a silicon-nitride-integrated vernier-ring-based filter and a integrated mirror of adjustable reflectivity. Photons generated via spontaneous radiation are selected by the resonant cavity and are repeatedly amplified in the gain medium through stimulated radiation. Due to mode competition, the selected mode achieves lasing while sidelobes, where the optical gain is smaller than the round-trip loss, remain suppressed.

Figure 10:
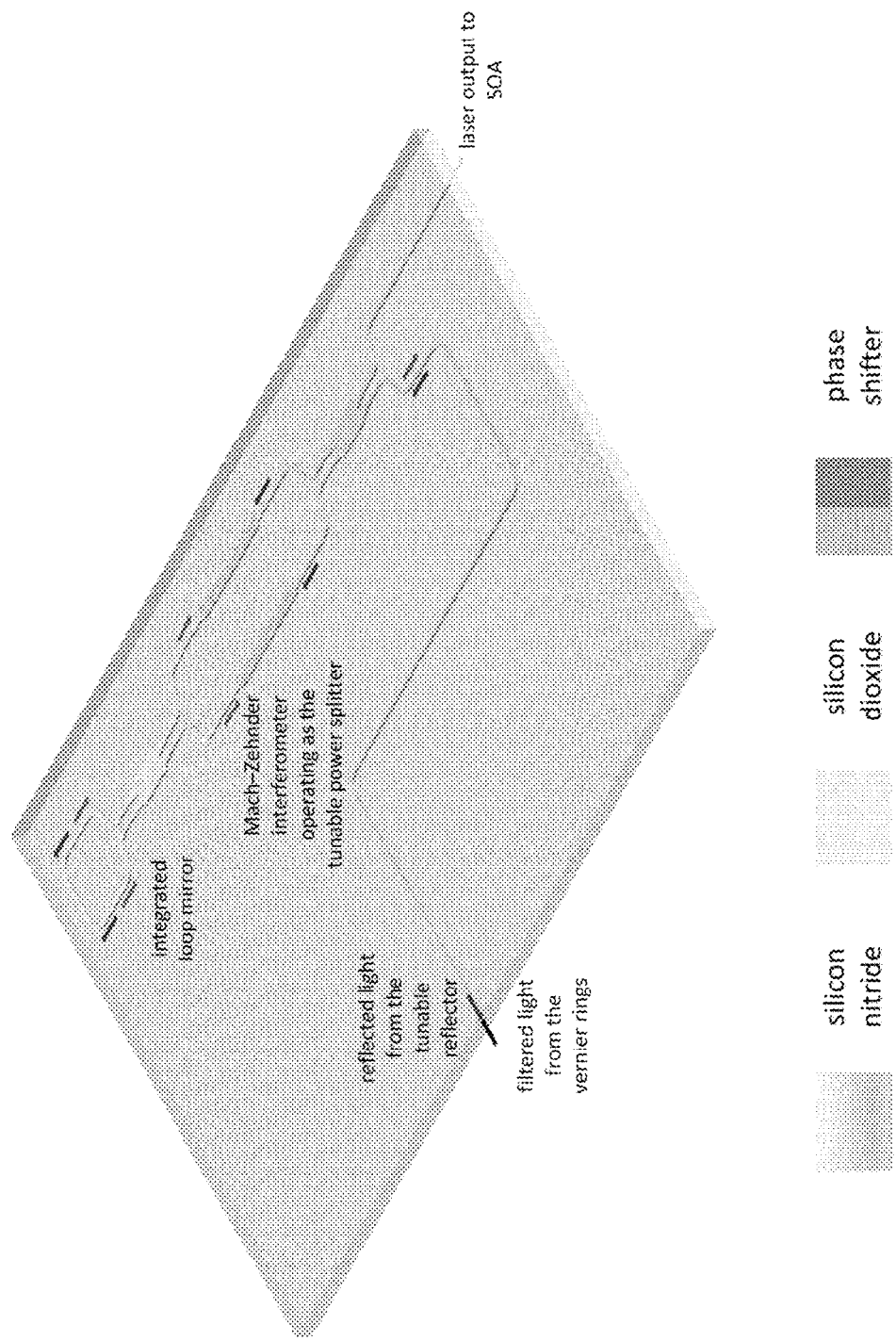
FIG. 10 shows the structure and working principle of the reflectivity-adjustable loop mirror in one embodiment of the present invention.

The resonance wavelength selected by the external cavity is dependent on the transmission spectrum of the cascaded vernier rings in the silicon nitride external cavity; as shown in FIGS. 9A and 9B, due to the vernier difference in the size/free-spectral-range of the rings, two wavelength tuning modes, namely continuous tuning and mode-hopping tuning, are simultaneously supported. To further improve the tuning speed, the micro-ring can be adjusted in geometrical length by piezoelectric deformation, and the resonant wavelength thereof is changed. The phase compensation in the photonic circuit is realized by the thermal-optic phase shifter. The optical energy after the vernier micro-ring is transmitted to the adjustable loop mirror, where it is input from one input port into a symmetric Mach Zehnder interferometer operating at nearly the 3-dB splitting state as shown in FIG. 10; after being splitted into two paths of equal-phase and equal-amplitude, the laser at the output ends of the interferometer, rounds the loop mirror and is input into the interferometer from the other side, and subsequently reflected back to the input end through coherent beam combination. A thermal-optic phase shifter or a piezoelectric deformation phase shifter can be integrated on the arms of the Mach Zehnder interferometer, and by changing the phase difference between the arms, the input laser can be routed to the laser output direction by means of coherent combining, so that adjustable reflectivity is realized. Additional thermal-optic phase shifter can be arranged after the output port, so that the phase of the laser output to the subsequent waveguide structure can be tuned. By virtue of the low-loss characteristic of the silicon nitride waveguide, the laser can obtain a narrow linewidth of hundreds to thousands of Hz; and meanwhile, by means of micro-ring tuning and adjustable mirror tuning, the laser output with adjustable wavelength, adjustable amplitude can be obtained.

The silicon nitride waveguide and its spot size converter after the laser cavity couples the laser output off the silicon/silicon-nitride chip to a low-noise transmission-type semiconductor optical amplifier. The optical amplifier also achieves population inversion by means of electric pumping, the atoms of high-energy-state participates in amplification of the output laser via stimulated radiation, so that the power of the output laser is greatly improved; and the amplified laser signal is then coupled to the silicon/silicon-nitride chip again through a spot-size converter on the facet, handled by the high power threshold of the silicon nitride waveguide.

On the basis of the above solution, the laser reinjected into the silicon/silicon-nitride multilayer platform is subjected to adjustable beam splitting by a second Mach Zehnder interferometer and is respectively conveyed to the transmitting end and a receiving end to be used as detection and reference light; taps and detectors can be further supplemented after the different output ports, where photo-generated carriers proportional to the power inside the corresponding ports are generated and amplified through with transimpedance amplifiers to feedback signals, so that the power monitoring of the laser module can be realized.

On the basis of the above solution, the reference light supplied to the receiving end passes through a third Mach Zehnder interferometer structure to either route the reference light to the on-chip receiving end or the off-chip backup receiving end so as to realize coherent or incoherent receptions of the different detection schemes.

Figures 11A, 11B:
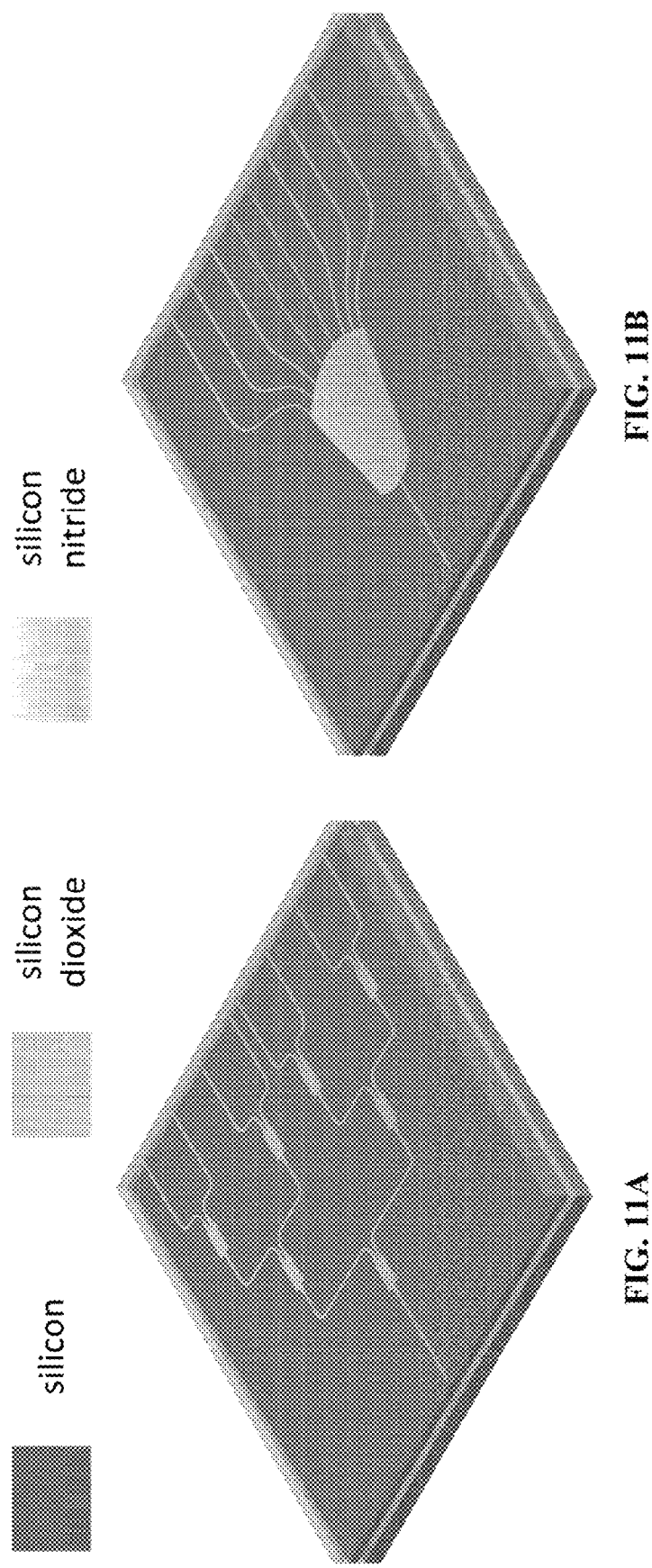

On the basis of the above solution, the laser supplied to the transmitting end in the main bus will be splitted into the active phased array channels via a star coupler or a cascaded multimode interferometer structure as shown in FIGS. 11A and 11B. Since the typical number of phased array channels are larger than or equal to 16, the power in the channels will be significantly reduced so as to be compatible with the power threshold of the silicon-based platform. Obviously, as the number of channels increases, the overall power threshold of the chip will depend only on the design of the silicon nitride bus waveguide.

Figure 12:
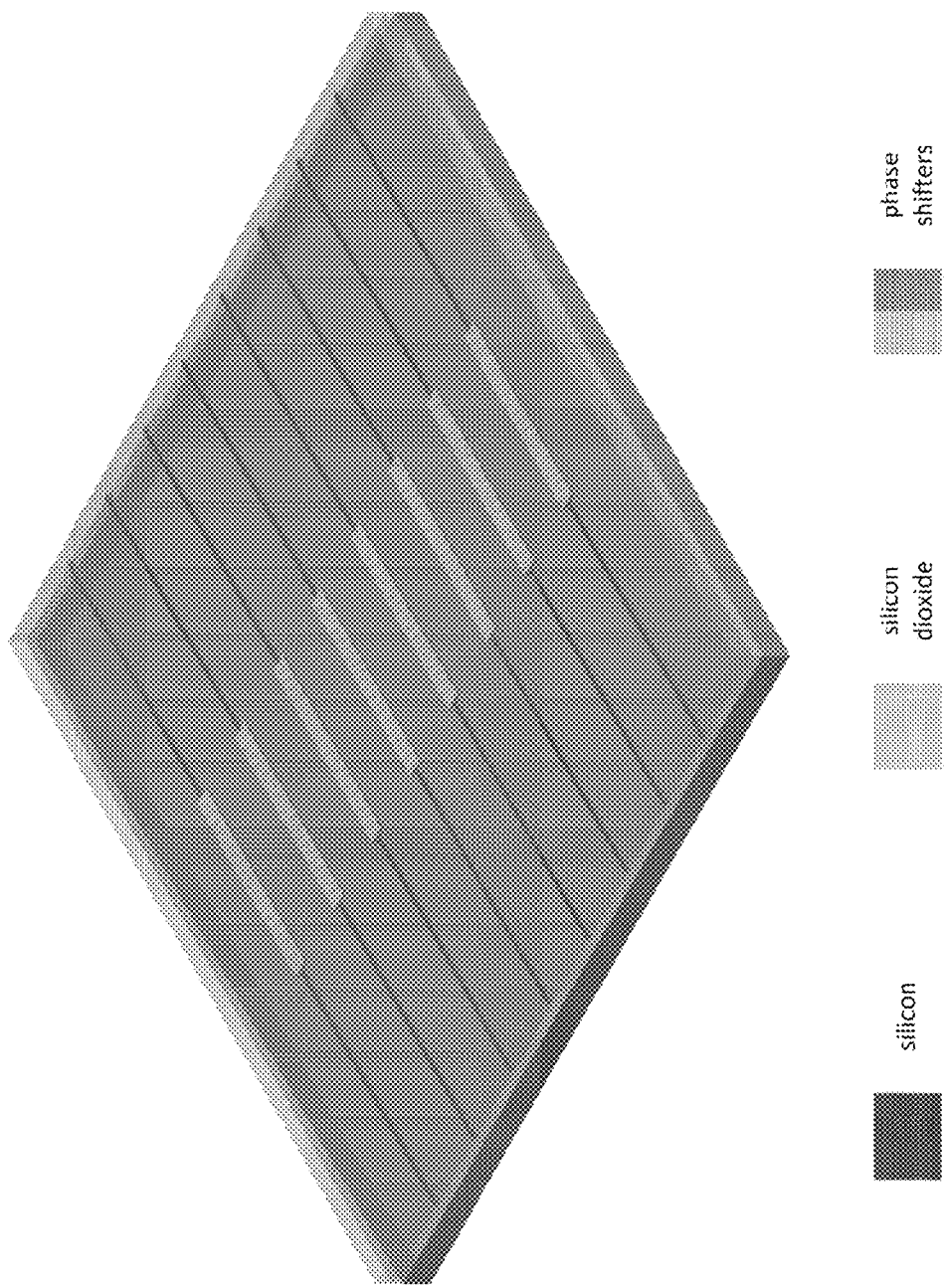
FIG. 12 shows the silicon-integrated phase shifter array in one embodiment of the present invention.

On the basis of the above solution, the optical energy splitted into the individual channels will be coupled from the silicon nitride waveguides into the silicon-based waveguides by means of the interlayer couplers as shown in FIGS. 6A to 6C, and is subsequently phase-shifted by a thermo-optic phase shifter or an electro-optic phase shifter as shown in FIG. 12. For example, the thermo-optic phase shifter changes the refractive index of silicon by thermo-optic effect so as to change the optical path length experienced by the guided light; and the electro-optic phase shifter provides phase shift via free-carrier dispersion effect, which can result in some tuning dependent loss.

On the basis of the above solution, the phase-shifted lights within individual channels are coupled from the silicon-based waveguides to the silicon nitride waveguides through the interlayer couplers. Therefore, the merits of easy tuning of the silicon-based waveguide, high fabrication tolerance, low loss and high power threshold of the silicon nitride waveguide, are combined to the maximum extent.

On the basis of the above solution, ultra-high density arrangement of the transmitting antennas can be implemented through inter-layer coupling and crosstalk management between different silicon nitride waveguide layers. If N layers of silicon nitride waveguides can be integrated on a multi-layer platform and the minimum coupling-suppressed interval between the silicon nitride antennas is D, the final antenna density of the system can be reduced to D/N. Large-scale aliasing-free beam-steering can be achieved by using a simple uniform array with concentrated main lobe power.

Figure 13B:
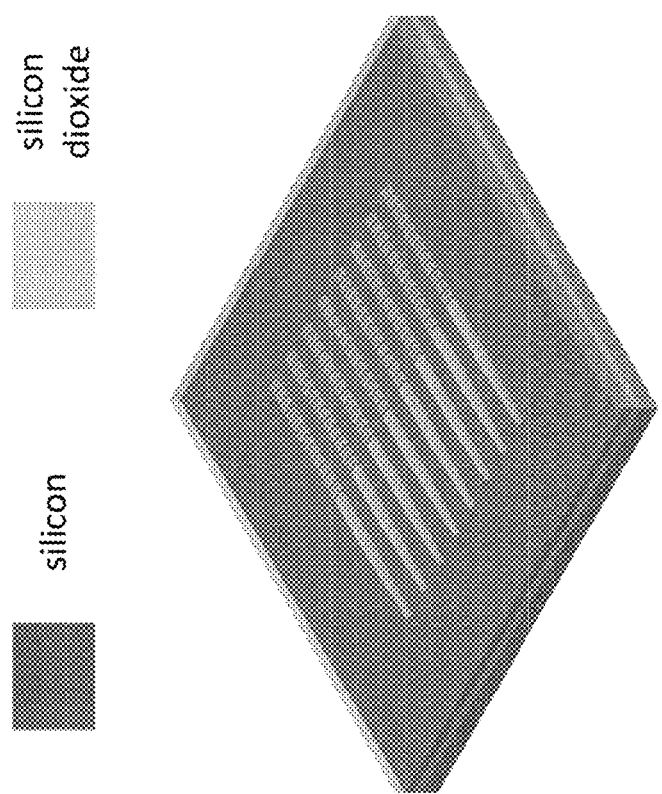

On the basis of the above solution, the sandwiched coaxial transceiving arrays are composed of multi-layer-etched silicon nitride waveguide grating antennas as shown in FIGS. 13A and 13B. Based on the principle of reciprocity of light propagation, to optimize the multi-layer-etched structure for high-efficiency upward emission is equivalent to optimize it for upward receiving and can be achieved by optimizing the grating strength and the relative position of the refractive index perturbations; similarly, the elimination of downward emission is equivalent to downward reception; therefore, the unidirectional antenna can not only maximally transmit the energy off-chip, but also can prevent emission-based crosstalk between the layers. Therefore, this ensures that the transmitted light of the output array are not coupled back into the coaxially arranged receiving array.

On the basis of the above solution, laser echoes or the signal light are directionally received by a single-layer sparse or vernier optical phased array which is the same in structure and principle but has geometric difference in antenna arrangement for the Rx-end. Direction-insensitive reception is performed by a lens of large numerical aperture or an spatial optical system of large numerical aperture for the Bk-end. The receiving optical phased array realizes directional reception according to the the principle of reciprocity of light propagation, is sparser in geometry, can be consistent in the number of channels, and can also be properly thinned. The design should maintain or achieve higher directivity while covering a larger area, and has the same photonic components as the transmitting array, which is not described in detail here; and the lens optical system focuses and couples the reflected light back into the optical fiber according to a typical collimator design, and the corresponding design is a mature conventional technical solution, which will not be described in detail herein.

Figure 14:
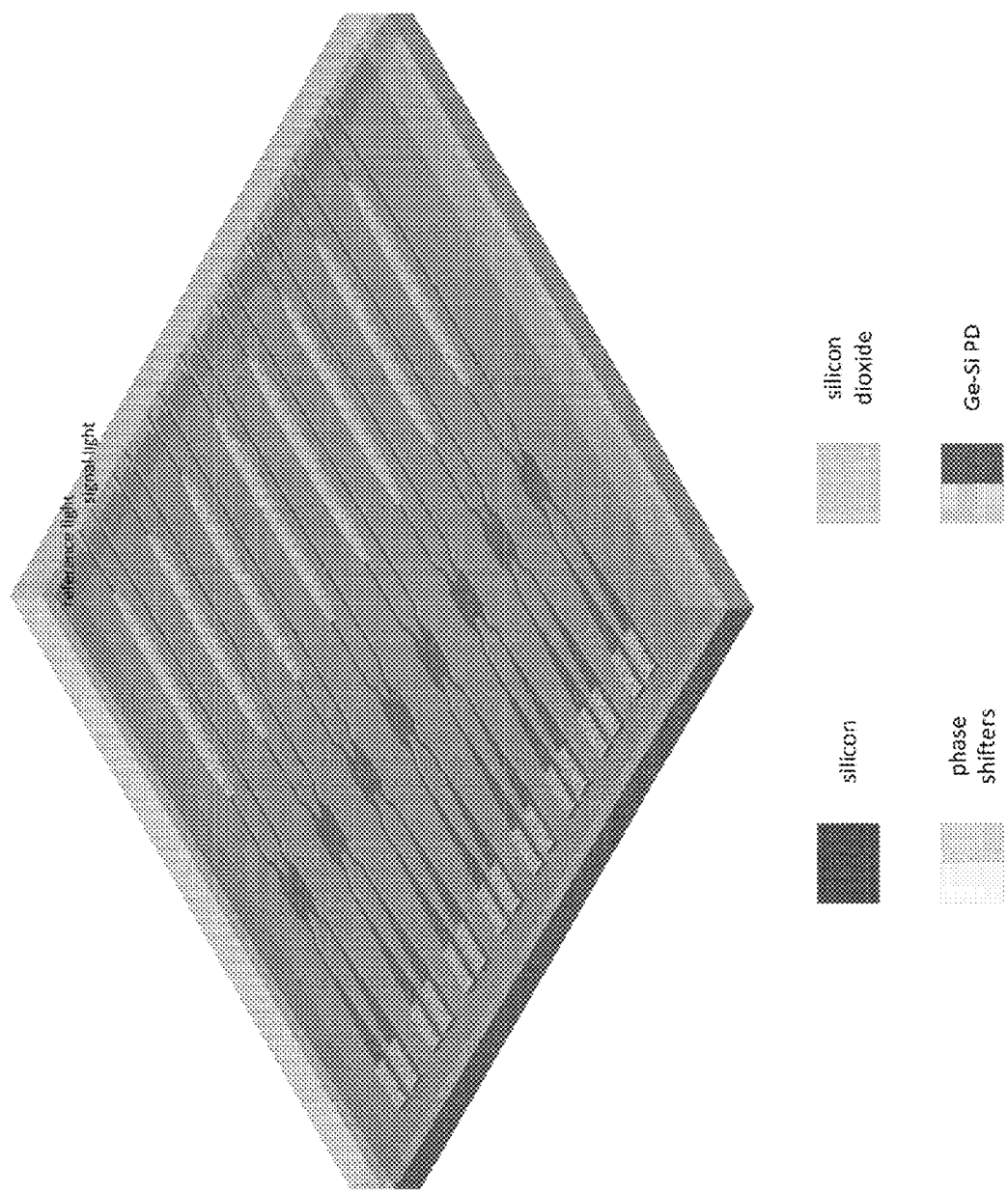
FIG. 14 shows the coherent receiving module in one embodiment of the present invention.

On the basis of the above solution, the optical signal obtained through the receiving array or the spatial optical module is input to the on-chip or off-chip coherent receiving module. The structure and the principle of the on-chip coherent receiving module are shown in FIG. 14, while the off-chip module can adopt a single photodetector of large surface area or a surface array of them where both the signal light and the reference light are collimated from the fibers to illuminate the PD surface. The reference light and signal light are subjected to photodetection by to obtain the photocurrent, and the photocurrent is subjected to operational amplification by a transimpedance amplifier and is output into a voltage signal of high common mode noise suppression. Note that when only the one input has light injected into the structure, the structure is equivalent to a photodetector followed by a transimpedance amplifier and can be used as a common photodetector so as to be compatible with both TOF and FMCW ranging schemes.

On the basis of the above solution, the layout adopts the specification where adjacent layers are used for coupling while overlapping structures and crossings will be handled on every other layer, so that the interlayer coupling efficiency is improved, and crosstalk during signal routing is inhibited. It is complementary that the silicon nitride antennas of the upper and lower layers of the Tx and Rx arrays do not overlap each other, so that the current coaxial arrangement can be used. For potential overlapping incidences, the gratings belonging to the transmitting side can be removed according to design requirements, and as many receiving gratings as possible are maintained to maximize effective receiving area; otherwise, to minimize target aliasing, grating on the receiving side should be removed instead, and the receiving performance degradation caused by partial grating removal should be compensated by using a receiving array with a larger overall area.

On the basis of the above solution, all involved silicon waveguides or silicon nitride waveguides can be designed in different geometries and matched with each other by adopting a taper-based spot-size converter to strike a better balance among the bending radius, the power threshold, the insertion loss and the accumulated phase error of the interconnecting waveguides. For example, wide waveguide structures can be used for long distance/high power routing to increase power tolerance, reduce losses and phase error, while narrow waveguide can be used to achieve smaller bending radii.

On the basis of the above solution, the power supply, the electric signal input and output ports of the chip system adopts power integrity and signal integrity designs required by a high-speed circuit package, and the opto-electro hybrid package can be implemented by adopting a multi-chip module (MCM) or a system in a package (SIP) with an upper computer which is realized by typical integrated circuits such as a Field-programmable Gate Array (FPGA), an Application-Specific Integrated Circuit (ASIC) and the like. Since the chip system does not contain or require an external optical port, i.e. optical signal is generated on the chip, and is controlled and processed on the chip, the required opto-electro package as well as the hardware and software design specifications of the upper computer are mature conventional technical solutions, which will not be described in detail here.

On the basis of the above solution, due to the fact that the chip system is small in size, the silicon/silicon-nitride chip is CMOS compatible, the III/V chip is mature in process, relatively low in cost, multiple such chips can be used to form a synthetic aperture LiDAR, and a central controller will be used for controlling and data analysis so as to improve the overall performance.

By multi-platform and multi-field hybrid integration, the present invention implements high-speed flexible beamforming, rotation and directional receiving of laser signals in the free space in a phased array mode. The present invention has the advantages of no active device, high integration density, good CMOS compatibility, low large-scale mass production cost and extremely high practical value.

It is readily understood by those skilled in the art that the foregoing description is of the preferred embodiments of the present invention and is not intended to limit the present invention. Any modifications, equivalent substitutions and improvements made in the spirit and principles of the present invention shall be covered by the protection of the present invention.

We claim:

1. A chip-scale silicon-based hybrid-integrated LiDAR system, comprising
    a transmitting end (Tx),
    a receiving end (Rx), and
    a backup receiving end (Bk),
    wherein the transmitting end sequentially comprises a hybrid-integrated narrow-linewidth tunable laser module (101), a silicon-nitride-integrated beam splitter module (102), a silicon-integrated phase shifter array module (103) and a silicon-nitride-integrated unidirectional transmitting antenna array module (104) w.r.t the optical path;
    the receiving end comprises a silicon-nitride-integrated unidirectional receiving antenna array module (201), a silicon-nitride-integrated beam splitter module (202) and a silicon-integrated coherent receiving module (203);
    the backup receiving end sequentially comprises a spatial optical module (301) and an off-chip coherent receiving module (302) w.r.t the optical path;
    the electric control of the hybrid-integrated narrow-linewidth tunable laser module (101) and the phase shifter of the silicon-integrated phase shifter array module (103) at the transmitting end and the signal processing of the silicon-integrated coherent receiving module (203) at the receiving end are implemented by a piggybacked high-speed integrated circuit module outside the photonic chip system on a ad-hoc basis.

2. The chip-scale silicon-based hybrid-integrated LiDAR system according to claim 1, wherein the laser module (101) simultaneously provides detection light and reference light required by the coherent LiDAR,
    the detection light input by the bus waveguide is evenly distributed in power by the beam splitter module (102) into N paths of waveguides, passes through the phase shifter array (103) with N channels, and finally leaves the chip system from the N-channel unidirectional transmitting antenna array (104) and enters free space to illuminate the target, and N is greater than or equal to 4;
    at the receiving end, a reference light input by the corresponding bus waveguide evenly distributed in power by the beam splitter module (202) into M channels of waveguides, meanwhile, the signal light reflected by the target is coupled into the M-channel unidirectional receiving antenna array (201) into the chip system, the M-channel reference light from the beam splitter module (202) and the M-channel signal light from the receiving antenna array module (201) are coherently combined in the coherent receiving module (203) to generate the electrical signal containing the target distance information, M is greater than or equal to 4, and M and N can be different in the specific implementation.

3. The chip-scale silicon-based hybrid-integrated LiDAR system according to claim 1, wherein the unidirectional transmitting antenna in the unidirectional transmitting antenna array (104) is implemented by a multilayer etched silicon nitride waveguide grating structure;
    periodic refractive index perturbation on the grating scatters the guided mode in the waveguide into free space and is introduced via etching;
    each grating period comprises two perturbations with different grating strengths; the suppression ratio of upward emission to downward emission are realized by optimizing the etching depth and the relative position of the perturbations and subsequently maximize upward constructive interference and downward cancellation.

4. The chip-scale silicon-based hybrid-integrated LiDAR system according to claim 1, wherein the final angular intensity distribution in the far-field of the transmitting end (Tx) is a directional beam obtained by interference of the radiation fields of the unidirectional antenna array, in other words, the optical power injected into the transmitting end is concentrated in one directional beam with extremely high directional gain; and
    by adjusting the phase relationship between the channels in the transmitting end and the operating wavelength of the laser, the light beam can be projected into the free space at an arbitrary direction in the hemisphere centered on the chip, and the available FOV is dependent on the specific design.

5. The chip-scale silicon-based hybrid-integrated LiDAR system according to claim 1, wherein the hybrid-integrated narrow-linewidth tunable laser module (101) comprises a tunable external cavity laser and an optical signal amplifier, and the external cavity is directly modulated.

6. The hybrid-integrated narrow-linewidth tunable laser module (101) according to claim 5, wherein the tunable external cavity laser comprises a gain chip and a silicon nitride tunable external cavity, and the gain chip is a reflective semiconductor amplifier chip processed from III/V materials;
    the filtering part of the silicon nitride external cavity adopts a double micro-ring resonator structure with a vernier effect, and the reflecting part of the external cavity adopts an integrated loop mirror structure with adjustable reflectivity;
    the gain chip and the external cavity together form a laser, and filtering and reflection characteristics of the external cavity are tuned with thermo-optic or piezoelectric deformation means so that a narrow linewidth laser signal with adjustable wavelength and amplitude is input into the subsequent amplification chip.

7. The hybrid-integrated narrow-linewidth tunable laser module (101) according to claim 5, wherein the optical amplifier adopts a one-stage to multi-stage cascaded transmission semiconductor optical amplifier.

8. The hybrid-integrated narrow-linewidth tunable laser module (101) according to claim 5, wherein the gain chip and the optical signal amplifier chip are hybrid-integrated by horizontal coupling with the silicon nitride waveguides, meanwhile, the input and output ports of the amplifier chip are required to be arranged on the same side to facilitate hybrid integration.

9. The hybrid-integrated narrow-linewidth tunable laser module (101) according to claim 5, wherein the optical amplifier finally re-inputs the high-energy narrow-linewidth laser into the silicon nitride waveguide, the energy is subsequently distributes to the transmitting end and the receiving end via an adjustable splitter, wherein most of the energy is supplied to the transmitting end as the detection light for target illumination;

the remaining energy input to the receiving end is used as the reference light for coherent detection and can be routed to the in-chip receiving end or the off-chip backup receiving end by another adjustable splitter; and power monitoring means can be additionally configured on two bus waveguides of detection light and reference light as required after the energy distribution, and the feedback can be used to tune both the amplifier and the adjustable splitter for proper energy distribution.

10. The chip-scale silicon-based hybrid-integrated LiDAR system according to claim 1, wherein the beam splitter module (102/202) is implemented using a cascaded multi-mode interferometer or a star coupler as the passive beam splitting structure.

11. The chip-scale silicon-based hybrid-integrated LiDAR system according to claim 1, wherein the phase shifters in the phase shifter array module (103) and the silicon-integrated coherent receiving module (203) can adopt the high-speed thermal-optic phase shifters or the electro-optic phase shifters, and the control of driving voltage of the phase shifters is implemented by adopting a CMOS digital-to-analog converter integrated in the photonic chip, or a CMOS digital-to-analog converter on another chip co-integrated with the photonic chip using multi-chip package, and the digital-to-analog converter is connected with the main control circuits by high-speed electrical connections.

12. The chip-scale silicon-based hybrid-integrated LiDAR system according to claim 1, wherein the unidirectional transmitting/receiving antenna array module (104/201) comprises silicon nitride unidirectional antennas arranged in an array, and the antennas adopt a multilayer etched silicon nitride waveguide grating structure.

13. The chip-scale silicon-based hybrid-integrated LiDAR system according to claim 1, wherein overlapping tapers for evanescent coupling are adopted between the silicon-based and the silicon-nitride-based optical waveguides to achieve coupling between different layers in a three-dimensional integrated chip, and the layout adopts the specification where adjacent layers are used for coupling while overlapping structures and crossings will be handled on every other layer.

14. The chip-scale silicon-based hybrid-integrated LiDAR system according to claim 1, wherein the silicon-integrated coherent receiving module (203) uses a Germanium-Silicon balanced detector to simultaneously receives the reference light and the signal light, and to achieve coherent reception with high directional gain and common mode rejection by performing matched phase shift on the reference light, whereby signal-to-noise ratio is improved and the electric signal containing the phase shift or the frequency shift dependent on the specific detection scheme is output to a signal processing module to retrieve the distance and/or speed information of the target illuminated by the detection light.

15. The chip-scale silicon-based hybrid-integrated LiDAR system according to claim 1, wherein the spatial optical module (301) condenses plane waves propagating in the free space by a large numerical aperture lens system, and couples the light into an optical fiber for delivery to the off-chip detector module.

16. The chip-scale silicon-based hybrid-integrated LiDAR system according to claim 1, wherein the off-chip detector module (302) obtains the signal light from the spatial optical module and the reference light from the on-chip adjustable splitter output port via optical fiber connection, and subsequently performs photodetection in a balanced detection mode, and transmits the electric signal to the signal processing module to retrieve the distance and/or speed information of the target illuminated by the detection light.

* * * * *